United States Patent [19]

Mizutani et al.

[11] Patent Number: 5,503,348
[45] Date of Patent: Apr. 2, 1996

[54] OPENING AND CLOSING OF A FRONT LID OF A TAPE CARTRIDGE

[75] Inventors: Hikaru Mizutani, Toyonaka; Yoshimi Maehara, Ootsu; Hidekazu Takeda, Fujisawa; Kenji Ogiro, Yokohama; Nobuyuki Kaku, Kanagawa, all of Japan

[73] Assignees: Hitachi Maxell, Ltd., Osaka; Hitachi, Ltd., Tokyo, both of Japan

[21] Appl. No.: 111,597

[22] Filed: Aug. 25, 1993

[30] Foreign Application Priority Data

| Aug. 26, 1992 | [JP] | Japan | 4-252224 |
| Oct. 16, 1992 | [JP] | Japan | 4-304949 |
| Nov. 20, 1992 | [JP] | Japan | 4-335222 |
| Nov. 27, 1992 | [JP] | Japan | 4-318160 |
| Nov. 30, 1992 | [JP] | Japan | 4-345346 |
| Dec. 2, 1992 | [JP] | Japan | 4-350341 |

[51] Int. Cl.$^6$ ................................. G11B 23/087
[52] U.S. Cl. .................. 242/347.1; 242/338; 360/132
[58] Field of Search .................. 242/347.1, 338, 242/338.2, 326.1, 324.2, 326.2, 348, 348.4; 360/132; 352/78 R; 354/275

[56] References Cited

U.S. PATENT DOCUMENTS

| 4,680,660 | 7/1987 | Ueda | 360/132 |
| 4,847,717 | 7/1989 | Satoh | 360/132 |
| 5,168,411 | 12/1992 | Fujii | 360/132 |

FOREIGN PATENT DOCUMENTS

| 2508223 | 6/1982 | France . |
| 61-210584 | 2/1987 | Japan . |

OTHER PUBLICATIONS

European Search Report for EP 93 11 3631.

*Primary Examiner*—John Q. Nguyen
*Attorney, Agent, or Firm*—Birch, Stewart, Kolasch & Birch

[57] ABSTRACT

A tape cartridge provided with a slider member slidably mounted for sliding movement in forward and backward directions at an outer side under surface on the bottom wall of a main casing for closing and opening a pocket, a front lid pivotally connected to the main casing for covering a front face of the main casing, an upper lid for closing the open upper face of the pocket, a front edge of the upper lid being pivotally connected to an upper edge of the front lid through pins such that when the front lid is pivoted for upward opening, the upper lid is displaced for retraction to a rear side from an open upper face of the pocket in association with the movement of the front lid.

2 Claims, 30 Drawing Sheets

OPENING AND CLOSING OF A FRONT LID OF A TAPE CARTRIDGE

BACKGROUND OF THE INVENTION

1. Field of the Invention

The present invention generally relates to a magnetic tape cartridge or tape cassette, and more particularly, to a tape cartridge having a pocket for tape loading at a front face of its main casing arranged to receive a head cylinder at the side of a video tape recorder in the pocket.

2. Discussion of Related Art

In a video tape recorder (VTR) such as a video camera or the like, there has been a demand for still a further compact size and a light weight VTR. In the above case, the tape cartridge to be dealt with has a pocket for tape loading at the front face of its main casing, and investigations have been made whereby a head cylinder at the side of a video tape recorder can be reduced in size for being accommodated in such a pocket, as a system which may meet the above requirements.

However, since there is a limitation to the size reduction of the head cylinder, the problem is related to the arrangement of the lid around the pocket of the main casing for inserting the head cylinder as far as possible without making contact.

FIGS. 38 and 39 show the construction of a conventional tape cartridge of this kind, more specifically, a tape cartridge for an 8 mm video tape. As shown in FIGS. 38 and 39, a front lid 11 for selective opening or closing of the front face of a main casing 1 is pivotally supported on the main casing 1, and at a position where a pocket 5 is formed, a back lid 130 is added to the front lid 11. By the above arrangement, in the lid closed state during non-use, the outer front face of the magnetic tape 3 is covered by the front lid 11 as shown in FIG. 38, while the rear face inner side of the tape 3 is covered by the back lid 130, thus, the magnetic tape 3 is surrounded by the front lid 11 and the back lid 130 including the upper face side of the pocket 5 for protection.

The back lid 130 is pivotally connected at its upper and lower intermediate portion, to the front lid 11 at opposite sides at points through shafts 131, and between the main casing 1 and the back lid 130, there is provided a guide means for opening the back lid 130 towards the upper face side of the pocket 5 for displacement. For the guide means, guide grooves 133 of a generally S-shape are formed on confronting faces of opposite side walls 6 at the left and right sides of the pocket 5 while arm pieces 134 are provided to depend from opposite side edges of the back lid 130, with slider pieces 135 being laterally formed to extend from the forward ends of the arm pieces 134, so that the slider pieces 135 are received in the guide grooves 133 for sliding movement. In the above arrangement, by the guiding action between the guide grooves 133 and the slider pieces 135, the back lid 130 is also raised upwardly for opening, together with the front lid 11, as shown in FIG. 39.

However, as is clear from FIG. 39, in use in which the front lid 11 is opened, the lower edge of the back lid 130 is in a state where it is extended forward to a large extent onto the upper surface of the pocket 5. In other words, the effective opening height H of the pocket 5 is lowered by the presence of the back lid 130. Therefore, if it is intended to cause the head cylinder D to enter deep into the pocket 5, the head cylinder D undesirably contacts and is obstructed the back lid 130, and this inconvenience has caused a bottleneck to achieve a compact size at the side of the video tape recorder.

Moreover, there is another conventional arrangement as disclosed in Japanese Patent Laid-Open Publication Tokkai-sho No. 61-210584, in which in the back lid 130, as shown in FIGS. 38 and 39, the main portion 130a and upper lid portion 130b are separately formed, and the forward edge of the upper lid portion 130b is pivotally connected to the upper edge of the front wall 11a of the front lid 11, with the remaining construction being substantially the same as in the known construction of FIGS. 38 and 39. The upper lid portion 130b covers the open upper face of the pocket 5 during non-use, while, during the upward opening of the front lid 11, it rides over the upper face of the upper wall of the main casing 1 for retreating backwards. In the above arrangement, however, the main portion 130a also largely extends over the upper surface of the pocket 5, and the effective opening height H of the pocket 5 is still limited.

SUMMARY OF THE INVENTION

Accordingly, an essential object of the present invention is to provide a tape cartridge which is arranged to allow a cylinder head at a side of a video tape recorder to be introduced deeply into a pocket of the main casing of the tape cartridge, as far as possible, thereby to contribute to the compact size and light weight at the side of the video tape recorder.

Another object of the present invention is to provide a tape cartridge which can accomplish the above object even when the depth of the pocket provided is not larger than necessary.

In accomplishing these and other objects, the tape cartridge according to the present invention is commonly provided with the following essential items:

(a) a main casing 1 having ports 4 formed at a front portion at left and right sides or openings thereof for drawing out the tape, and a pocket 5 for tape loading, open at its upper and lower sides and front side between the 4 and formed in a recess at the front portion of the main casing 1, (b) a front lid 11 pivotally supported for upward movement on the main casing by shafts 14 for selective opening and closing of the front portion of the main casing 1, (c) an upper lid 12 for opening and closing an upper face of the pocket 5 following the opening and closing of said front lid 11, the upper lid 12 is pivotally connected, at a forward edge of the main face plate 12a of the upper lid 12, to an upper edge of the front wall 11a of the front lid 11 through pin means 20, and (d) a guide means provided between the main casing 1 and the upper lid 12 for guiding the upper lid 12 so that the main face plate 12a of the upper lid 12 retreats towards a rear portion on the upper face of the pocket 5 following the upward opening rotation of the front lid 11.

In a first aspect of the present invention, the tape cartridge provided with the essential items of the above (a) to (d) further includes arm pieces 22 provided to depend from opposite sides of the main face plate 12a of the upper lid 12, and having sliding pieces 23 provided at forward ends of the arm pieces 22, and arcuate guide grooves 24 formed in forward and backward directions on opposite side walls 6 of the pocket 5. The sliding pieces 23 of the arm pieces 22 are slidably received in the guide grooves 24 (FIGS. 1 to 8).

More specifically, the guide grooves 24 are each formed in a convex arcuate shape which coincides with a locus of displacement of the pins 20 connecting the front lid 11 with the upper lid 12 (FIG. 1).

The tape cartridge further includes tape guides 9 respectively provided at the forward edge of the side walls 6 of the pocket 5 and, confronting the tape draw-out ports 4, are outer peripheral face portions 9b of the tape guides 9, respectively, facing inside of the pocket 5 at the lower portions of the guide grooves 24. For the above purpose, cut-out portions 8 are respectively formed at the front edge lower portions of the side walls 6 of the pocket 5, and the outer peripheral portions 9b of the tape guides 9 face inside the pocket 5 through the cut-out portions 8 (FIGS. 1 and 8).

The forward edge of the main face plate 12a of the upper lid 12 is pivotally connected to the front wall 11a of the front lid 11 at a position which deviates above the shafts 14 (FIG. 1).

Moreover, in the position where the pocket 5 is present, at a forward edge of the upper wall of the main casing 1, an eaves wall 26 for closing an upper face at an inner rear side of the pocket 5 is formed to extend therefrom, with escape groove is 26a, for receiving the arm pieces 22 of the upper lid 12 upon retreat of the upper lid 12 rearward, being formed opposite sides of the eaves wall 26 (FIGS. 3 and 8).

A slider member 13 is slidably disposed at an outer side under the surface of the main housing 1, for movement in forward and backward directions so as to selectively open or close the under surface of the pocket 5 (FIGS. 1 and 8), and tape guides 9 are respectively provided at forward edges of the side walls 6 of the pocket 5, and confronting the tape draw-out ports 4. The main case 1 is formed, in its outer lower surface at positions corresponding to portions immediately below the respective tape guides 9, with reference holes 40 for positioning (FIGS. 5 and 7), whereby when the slider member 13 is displaced rearwardly for opening, positioning pins at the side of the video tape recorder engage the reference holes 40 from below (FIG. 3(C)).

The front lid 11 includes the front wall 11a which laterally covers the front face of the main casing 1 and side walls 11b extending rearwardly from opposite side edges of the front wall 11a, supported by corresponding side walls 15 of the main casing 1 through the shafts 14. The slider member 13 has a bottom wall 13a and side walls 13b extending upward from the opposite side edges of the bottom wall 13a. The side walls 13b of the slider member 13 are formed at forward edge sides thereof, with stepped portions 63 (FIGS. 11 and 12), whereby when the front lid 11 is in a closed state, lower edges of the side walls 11b of the front lid 11 are respectively received by the stepped portions 63 so as to restrict the upward rotation of the front lid 11 by contact therebetween. By this arrangement, when the slider member 13 is displaced rearward for opening, the stepped portions 63 escape in a rearward direction from the lower edge of the side walls 11b, and the front lid 11 freely pivots upward when opening.

The main face plate 12a of the upper lid 12 is laterally elongated and, as shown in FIGS. 14 and 15, the upper lid 12 is provided, at opposite side edges of the main face plate 12a, with walls 71 depending downward therefrom along outer side faces of the side walls 15 of the main casing 1, and between the side walls 13b of the slider member 13 and the depending walls 71, with engaging projections 72 and corresponding engaging concave portions 73, which are to be engaged with each other in the closed state of the upper lid 12, are respectively formed. In the above case, more specifically, the engaging projections 72 are formed at upper front edges of the side walls 13b of the slider member 13 so as to project forward therefrom, and the depending walls 71 of the upper lid 12 are formed, at rear edges thereof, with the groove-like engaging concave portions 73 in which the engaging projections 72 are respectively fitted from the rear side. Thus, by the engagement between the engaging projections 72 and the engaging concave portions 73, looseness of the upper lid 12 during non-use can be prevented.

In a second aspect of the present invention, the tape cartridge having the essential items (a) to (d) as described earlier further includes, in a position where the pocket 5 is present, a covering wall 11c for covering the forward edge of the main face plate 12a of the upper lid 12 from the front face side, which is integrally formed with the upper edge of the front wall 11a of the front lid 11 (FIGS. 16 to 20). In this case, the covering wall 11c is to prevent dust from entering inside through the connecting portion between the upper edge of the front wall 11a and the forward edge of the main face plate 12a.

The guide means for the upper lid 12 includes arm pieces 22 provided to depend from opposite sides of the main face plate 12a of the upper lid 12 and having sliding pieces 23 provided at forward ends of the arm pieces 22, and arcuate guide grooves 24 formed in forward and backward directions on opposite side walls 6 of the pocket 5, the sliding pieces 23 of the arm pieces 22 being slidably received in the guide grooves 24.

More specifically, the forward edge of the main face plate 12a of the upper lid 12 is formed into a convex arcuate shape in a longitudinal side sectional view, and the covering wall 11c is formed, in its inner face, into a concave curved face generally following the front edge shape of the main face plate 12a (FIG. 16).

Moreover, on the upper edge of the front wall 11a of the front lid 11, boss portions 82, having pins 20, are provided to extend rearward at the opposite sides of the covering wall 11c, with pin holes 21, pivotally receiving the pins 20, being provided at opposite ends on the front edge of the main face plate 12a of the upper lid 12 and, at the upper edges of the opposite side walls 6 of the pocket 5, recesses 81 for receiving and supporting the boss portions 82 from above in the closed state of the upper lid 12 are provided (FIGS. 17 to 20). Thus, it is intended that even when the laterally long front lid 11 supported at opposite two points is subjected to external forces, it is not readily deformed or damaged.

Furthermore, at an outer side bottom surface of the main casing 1, a slider member 13 is slidably attached for sliding movement in forward and backward directions and, in a lower edge inner face of the front wall 11a of the front lid 11, a recess portion 83 is provided to extend laterally so that a forward edge of the slider member 13 engages the recess portion 83 (FIG. 16), whereby entry of dust from the junction between the front wall 11a and the slider member 13 is also obstructed.

In a third aspect of the present invention, the tape cartridge having the essential items (a) to (d) as described earlier is provided with the guide means including sliding pieces 90 provided at the rear edge side of the main face plate 12a of the upper lid 12, and guide grooves 93 provided at the upper surface of the upper wall 91 of the main casing 1 and, at the rear portion of the upper surface of the pocket 5, with the slider pieces 90 slidably engaging the guide grooves 93 for sliding movement in forward and backward directions (FIGS. 21 to 26).

More specifically, the slider pieces 90 are provided at opposite sides of the rear edge side of the main face plate 12a of the upper lid 12, and a recess 92, for withdrawal of the main face plate 12a, is provided on the upper face of the upper wall 91 of the main casing 1, with the guide grooves 93 for engaging the slider pieces 90 being respectively provided at the opposite sides of the recess 92.

The tape cartridge for a fourth aspect of the present invention also provided with the essential items (a) to (d) as described earlier, includes a guide means provided between the main casing 1 and the upper lid 12 for guiding and displacing the upper lid 12 so that the main face plate 12a of the upper lid 12 rides over the upper surface of an upper wall 104 of the main casing 1 for withdrawal following the upward opening rotation of the front lid 11, and the front lid 11 has a spring member 108 for depressing and urging the upper lid 12 so that the main face plate 12a thereof contacts the upper wall 104 (FIGS. 27 to 30).

More specifically, in the above guide means, an inclined guide face 105 inclining downwards and forward is formed at the front edge of the upper wall 104 of the main casing 1, and another inclined guide face 106 inclining upwards and rearward is formed at the rear edge side on the under face of the main face plate 12a of the upper lid 12 (FIG. 28), and the spring member 108 is made of a torsion spring, and simultaneously rotates and urges the front lid 11 into a closed state.

In the above arrangement for the representative first aspect of the present invention in FIGS. 1 to 8, during non-use of the tape cartridge, the front wall 11a of the front lid 11 covers the front face outer side of the tape 3 drawn out into the front face of the main casing 1, while the upper lid 12 covers the upper face of the pocket 5, and the slider member 13 closes the under face of the pocket 5 (FIG. 3(A)).

Upon loading of the tape cartridge on the video tape recorder, the slider member 13 is displaced rearward for opening, and the front lid 11 is pivoted upward about the shafts 14 for opening. Following the upward opening rotation of the front lid 11 as described above, the upper lid 12 is subjected to parallel displacement rearward while being raised above the pocket 5 by the rearward and upward sliding movement of the respective slider pieces 23 along the guide grooves 24, as shown in FIG. 3(B).

As described above, since the upper lid 12 can be opened and displaced to a large extent towards the upper surface rear portion of the pocket 5 along the arcuate guide grooves 24 by connecting the forward edge of the main face plate 12a thereof to the upper edge of the front wall 11a of the front lid 11, the pocket opening height H becomes larger than that in the conventional arrangements, and the head cylinder D may be inserted deep into the inner portion of the pocket 5 without any obstruction by the upper lid 12.

By only forming the guide grooves 24 in the side walls 6 of the pocket 5 in the forward and backward directions thereof, the upper lid 12 may be fully displaced towards the rear portion of the upper surface of the pocket 5, even when the depth of the pocket 5 is the same as that in the conventional arrangements.

Since the outer peripheral portion 9b of the tape guide 9 is directed i to the pocket 5, the tape 3 may be smoothly guided onto the head cylinder D inserted into the pocket 5.

BRIEF DESCRIPTION OF THE DRAWINGS

These and other objects and features of the present invention will become apparent from the following description given hereinbelow taken in conjunction with the preferred embodiment thereof with reference to the accompanying drawings, in which.

DETAILED DESCRIPTION OF THE INVENTION

Figure 1:
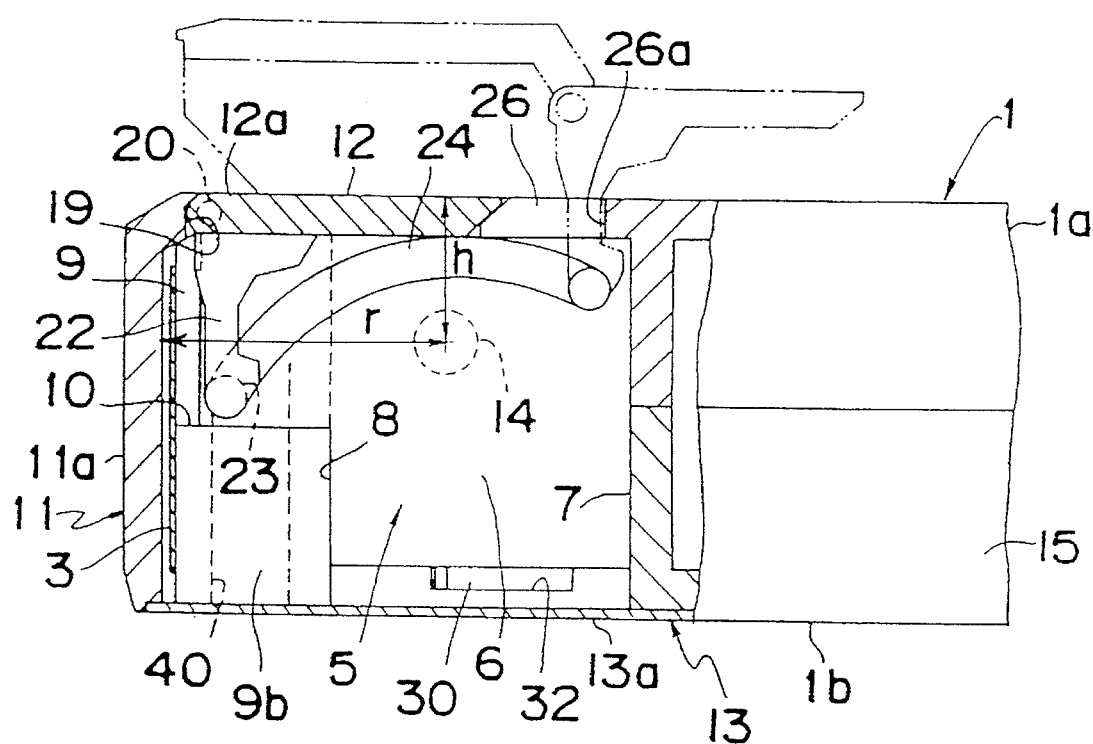
FIG. 1 is a fragmentary side sectional view of a tape cartridge according to a first embodiment of the present invention, in a state where its lid is closed.

Before the description of the present invention proceeds, it is to be noted that like parts are designated by like reference numerals throughout the accompanying drawings.
(First embodiment)

Referring now to the drawings, there is shown in FIGS. 1 to 8, a tape cartridge for video use according to a first embodiment of the present invention, which generally includes a main casing 1 having an upper casing 1a and a lower casing 1b made, for example, of a plastic material, which are butted against each other to be combined to form the main casing 1, and a pair of reels 2 rotatably provided at left and right sides within the main casing 1, wound with a magnetic tape 3. The main casing 1 is provided at left and right portions in its front side, with ports 4 for drawing out to, and at a central portion in the front side of the main casing 1, a pocket 5 for tape loading is provided between the tape ports 4. The opposite side walls 6 for the pocket 5 are formed by wall members integrally depending from the upper casing 1a, and by these side walls 6, the pocket 5 is separated from the respective tape ports 4. A rear wall 7 of the pocket 5 is constituted by wall members integrally formed with the upper and lower casings 1a and 1b to extend outward therefrom and butted against each other to be joined, and this rear wall 7 serves as a partition between the pocket 5 and the tape accommodating space within the main casing 1.

Figure 5:
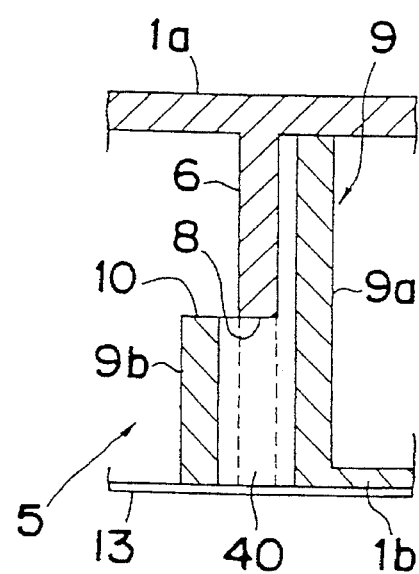
FIG. 5 is a Cross section taken along the line V—V in FIG. 4.
Figure 8:
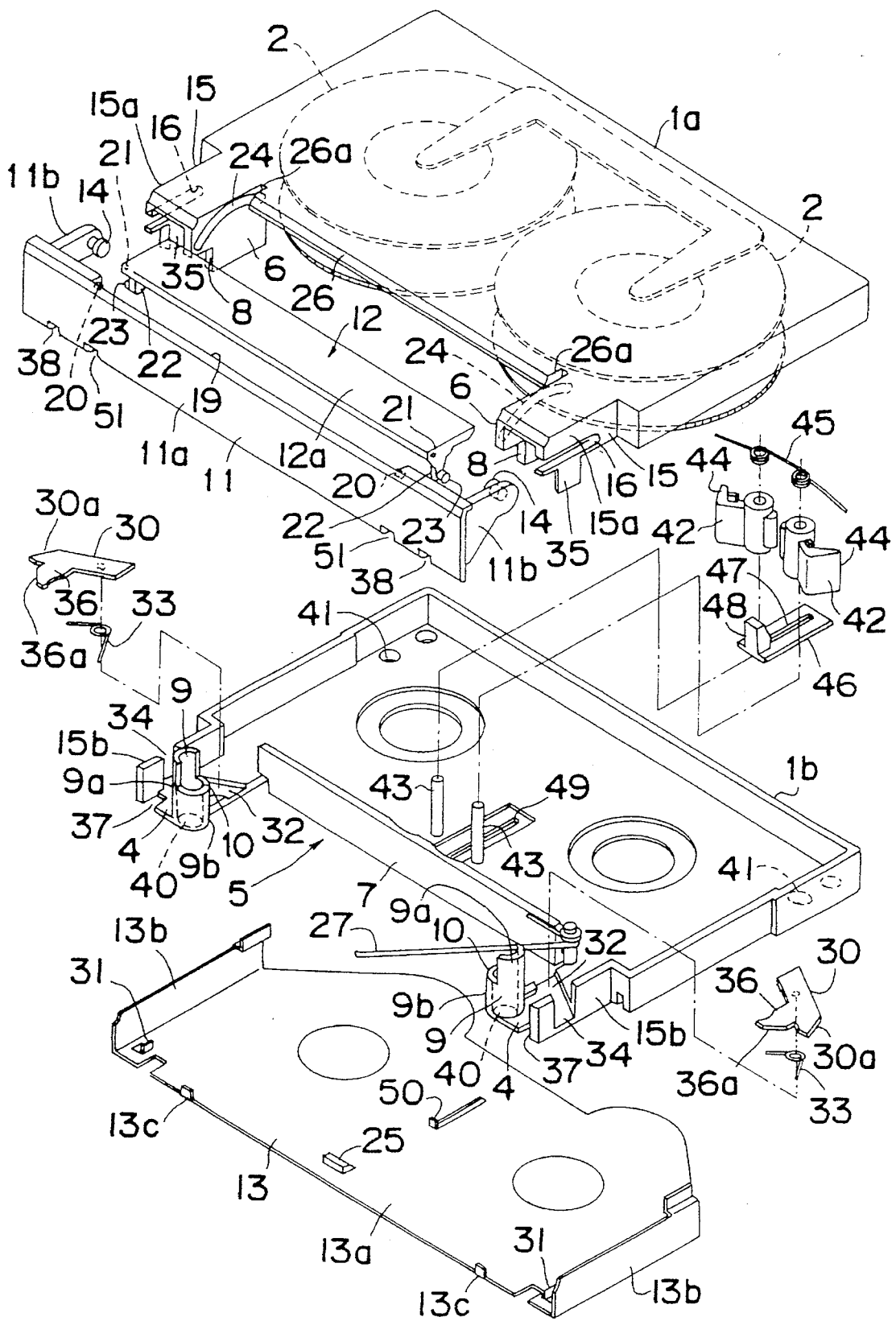
FIG. 8 is an exploded perspective view of the tape cartridge in FIG. 2.
Figure 9:
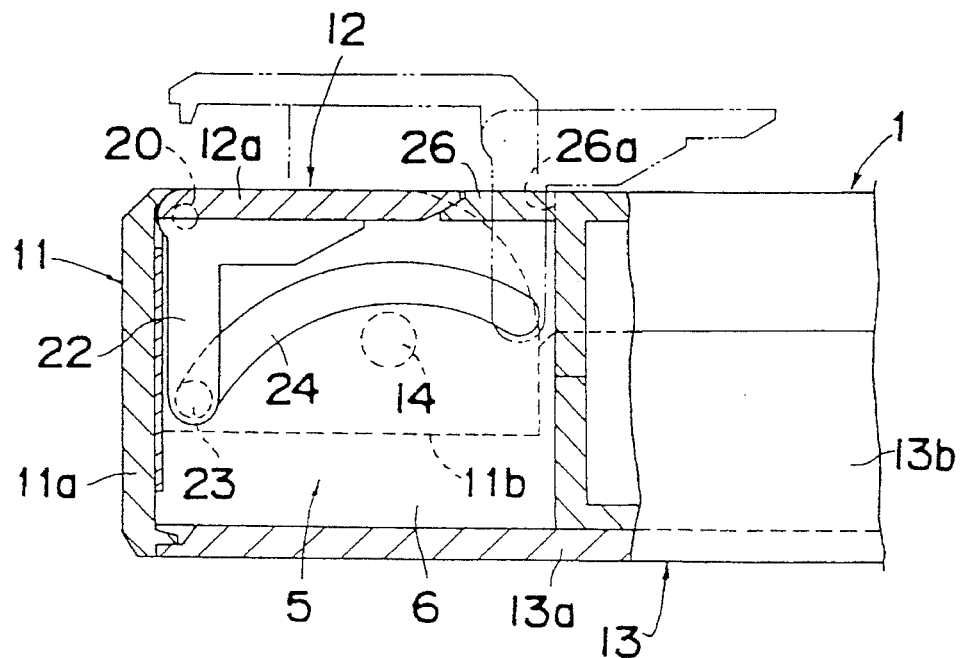
FIG. 9 is a fragmentary side sectional view of a tape cartridge according to a second embodiment of the present invention, in a state where its lid is closed.
Figure 10:
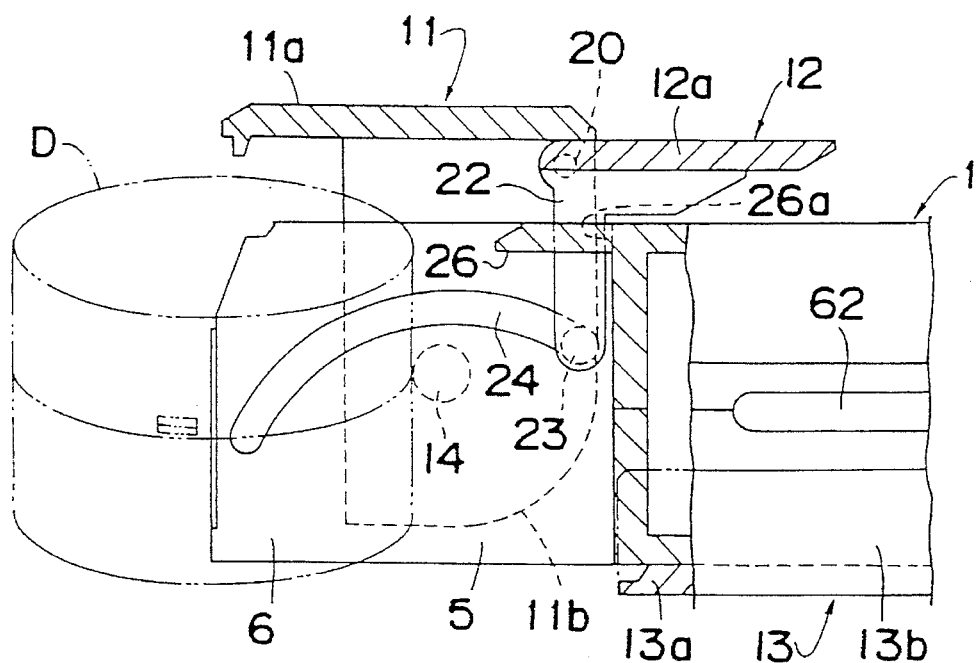
FIG. 10 is a view similar to FIG. 9, which particularly shows a state where its lid is opened, together with a relation with respect to a head cylinder.

In FIGS. 5 and 8, at the forward edges of the respective opposite side walls 6 of the pocket 5, tape guides 9 are provided integrally formed with the lower case 1b to extend upward therefrom. Each of the tape guides 9 is formed generally into a cylindrical shape in a cross section having a semi-circular outer peripheral portion 9a facing the tape draw-out ports 4 and another semi-circular outer peripheral portion 9b directed towards the side of the pocket 5. The outer peripheral portion 9b directed to the pocket 5 is cut off approximately at its upper half as indicted by Numeral 10(FIG. 8).

Meanwhile, each of the forward edges of the opposite side walls of the pocket 5 is also cut out generally at its lower half to provided a cut-out portion 8, and when the outer peripheral portions 9b i are fitted into the cut-out portions 8, the outer peripheral portions 9b are respectively directed to the forward edges at left and right sides of the pocket 5.

Figure 2:
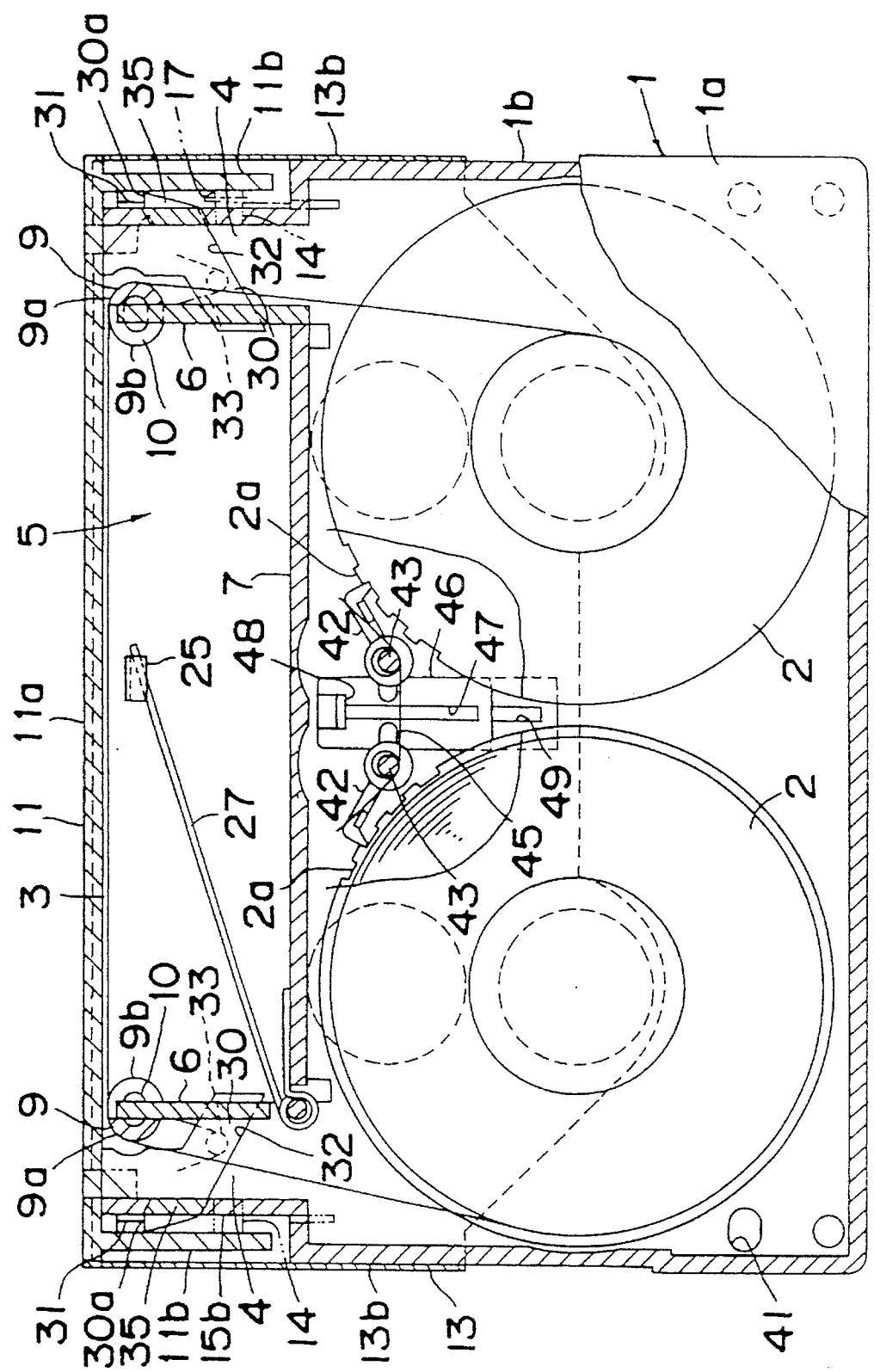
FIG. 2 is a top plan view of the tape cartridge in FIG. 1 partly broken away for clarity.

In FIG. 2, the magnetic tape 3 is drawn out from one reel 2 into the tape draw-out port 4 provided before the first reel 2, and after being led into the other tape draw-out port 4 through the front face of the pocket 5, wound onto the other reel 2 behind the the other port 4.

For protection of the tape and prevention of dust during non-use, the front face of the main casing 1 is closed by a front lid 11 for selective opening and closing, and the upper face of the pocket 5 is closed by an upper lid 12, and the under face of the pocket 5 is closed by a slider member 13, respectively, for selective opening and closing.

In FIGS. 2 and 8, the front lid 11 is provided with a front wall 11a for blocking the front face of the main casing 1 including the pocket 5 and the tape draw-out ports 4, and opposite side walls 11b are integrally formed with left and right side edges of the front wall 11a to extend toward the rear portion of the main casing 1. In the inner faces of the opposite side walls 11b, shafts 14 are respectively provided to extend towards each other, while shaft holes 16 are provided in side walls 15 of the main casing (at the side of the upper casing 1a), so that the shafts 14 are rotatably supported in the shaft holes 16 from outer sides as shown in FIG. 8, whereby the front lid 11 can be pivoted upward for opening about the shafts 14 on the whole.

In order to allow the front wall 11a to be raised higher than the upper face of the pocket 5 for the upward opening rotation during the upward opening of the front lid 11, in the closed state of FIG. 1, a distance r between the front wall 11a of the front lid 11 and the center of the shaft 14 is set to be more than about two times larger than a distance h between the upper surface of the pocket 5 and the center of the shaft 14.

Moreover, as shown in FIG. 2, the front lid 11 is normally urged to rotate in the closing direction by a torsion coil spring 17 attached to one of the shafts 14.

In FIGS. 1 and 8, the upper lid 12 has a flat main face plate 12a for closing the open upper face of the pocket 5, and the front edge of the main face plate 12a is pivotally connected to the upper edge of the front wall 11a through pins 20. More specifically, as shown in FIG. 8, the front wall 11a is cut out at its upper edge central portion to provide an elongated cut-out portion 19, with the pins 20 being provided at opposite sides in the cut-out portion 19. Thus, the forward edge of the main face plate 12a of the upper lid 12 is fitted into the cut-out portion 19 at the side of the front wall 11a, with the pins 20 being fitted into pin holes 21 provided at opposite sides of the front edge of the main face plate 12a.

The front edge of the main face plate 12a of the upper lid 12, i.e., position for the pins 20, is located above and at a forward position with respect to the shafts 14 of the front lid 11.

Between the main casing 1 and the upper lid 12, there is provided a guide means for guiding the upper lid 12 so that the main face plate 12a thereof is displaced from a position to close the open upper face of the pocket 5 to a position removed to an upper face rear portion of the pocket 5, following the upward opening rotation of the front lid 11.

The guide means including arm pieces 22 are each provided to depend downward from opposite sides of the main face plate 12a of the upper lid 12, having slider pieces 23 provided at outer side on forward ends of the arm pieces, and arcuate guide grooves 24 rising rearward, formed in forward and backward directions on opposite side walls 6 of the pocket 5 at upper edge sides of vertical walls facing the pocket 5, with the sliding pieces 23 of the arm pieces 22 being slidably received in the guide grooves 24. The guide grooves 24 are each formed in a convex arcuate shape which coincides with a locus of displacement of the pins 20 drawn by the upward opening rotation of the front lid 11.

Figure 3A:
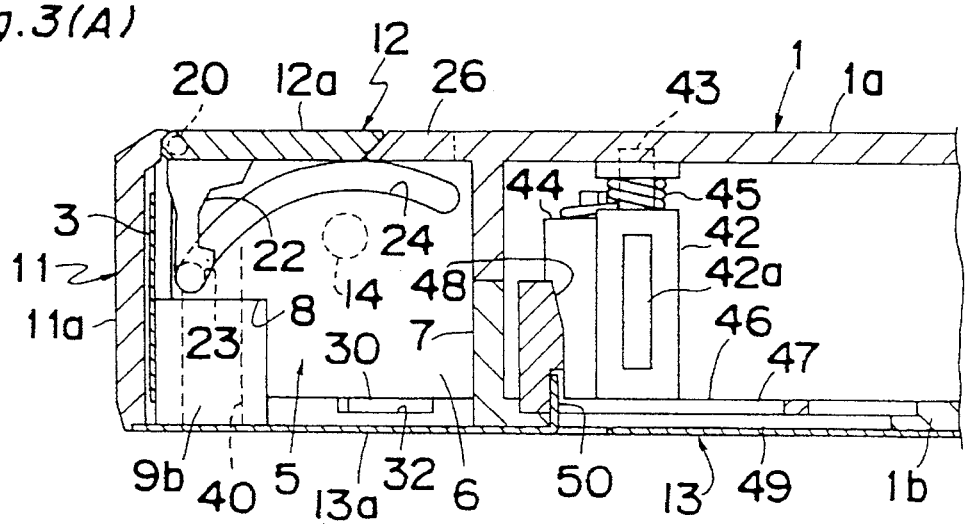
FIGS. 3(A), 3(B) and 3(C) are fragmentary side sectional views of the tape cartridge in FIG. 1 for explaining opening and closing of its pocket.
Figure 3B:
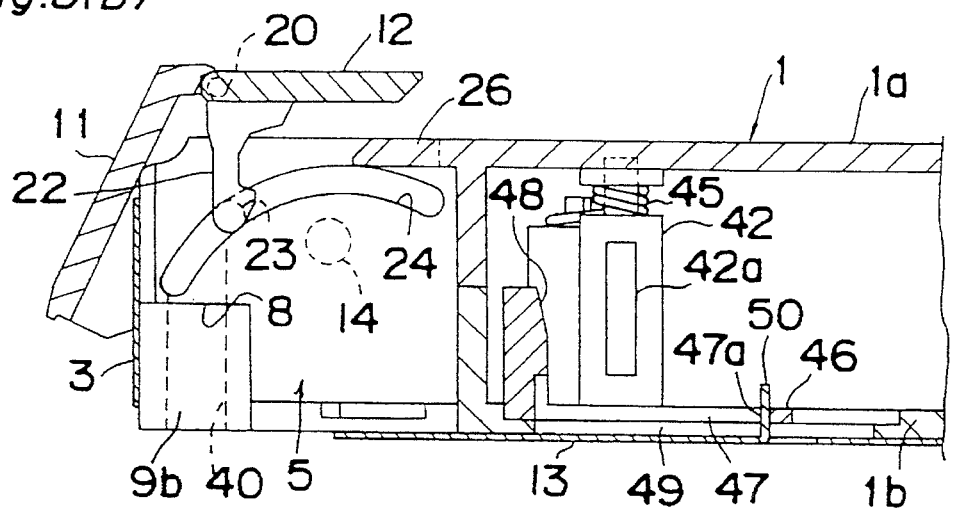
Figure 3C:
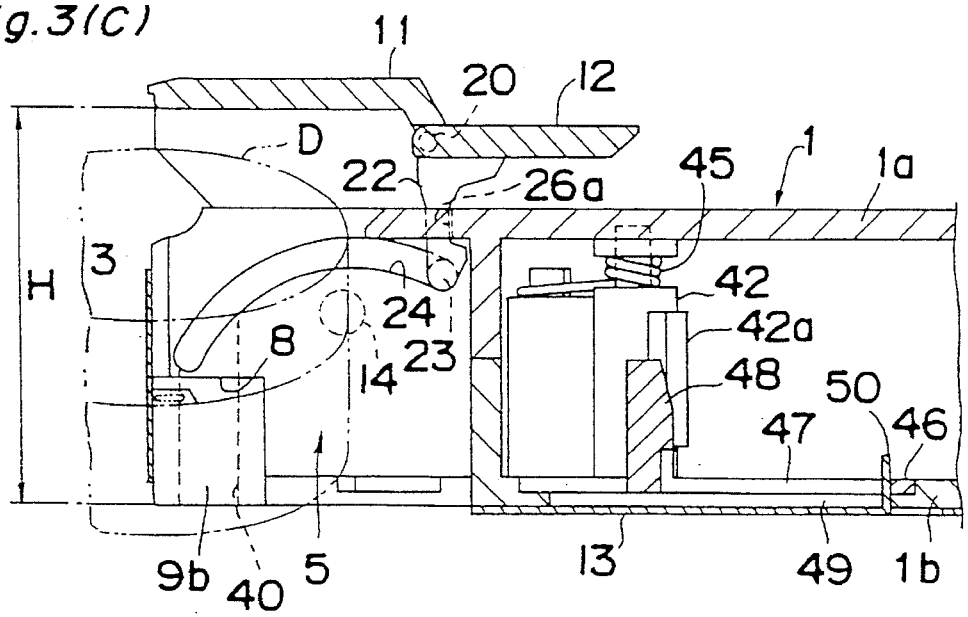

By the above arrangement, the upper lid 12 is subjected to the parallel displacement in the forward and backward directions by,maintaining the horizontally closed state at all times, between a closed position where the main face plate 12a continues on the upper rear edge of the front lid 11 to close the upper surface of the pocket 5 (FIG. 3(A)) and an open position where the main face plate 12a moves rearward from the upper surface of the pocket 5 (FIG. 3(C)). When the upper lid 12 is at the open position in FIG. 3(C), the main face plate 12a is located above the upper wall of the main casing 1 moved rearward from the upper surface of the pocket 5 to a large extent.

Moreover, as shown in FIGS. 3 and 8, in the position where the pocket 5 is present, at a forward edge of the upper wall of the main casing 1, an eaves wall 26 for closing an upper surface at an inner rear side of the pocket 5 is formed to extend therefrom, and escape grooves 26a for receiving the arm pieces 22 of the upper lid 12 upon movement of the upper lid 12 rearward are formed at opposite sides of the eaves wall 26, and thus, during the opening function of the upper lid 12, the arm pieces 22 enter the escape grooves 26a to avoid contact with the eaves wall 26.

In FIGS. 5 and 8, the slider member 13 is formed into a laterally elongated U-shape cross section having a bottom wall 13a located on an under surface outside the main casing 1 and opposite side walls 13b extending upward from opposite side edges of the bottom wall 13a and located at the outer sides of opposite side walls 15 of the main casing 1, and is slidably mounted to the main casing 1 for sliding movement in forward and backward directions. Specifically, the slider member 13 moves along the under surface of the main casing 1 in a forward and backward direction between the front closed position (FIG. 3(A)) for closing the under surface of the pocket 5, and the rear open position (FIG. 3(C)) for opening the under surface of the pocket 5.

For urging the entire slider member 13 towards the forward closed position, a torsion spring member 27 is connected, at its coil portion, to one end of the rear wall 7 of the pocket 5, with an end of its one arm being engaged with a spring receiver 25, as shown in FIG. 8.

It is necessary that the slider member 13 is locked so as not to be displaceable at the closed position. For this purpose, as shown in FIGS. 4 and 8, locking plates 30 are slidably disposed for movement in a slantwise direction at a position towards the rear side from the tape guides 9 on the inner bottom face of the opposite tape draw-out ports 4, with projections 31 being provided on the upper face of the bottom wall 13a of the slider member 13 for engagement with claws 30a at the forward ends of the locking plates 30.

In the inner bottom face of the tape draw-out ports 4, thickness reduced recesses 32 extending laterally slantwise are formed to receive the locking plates 30 therein, and the locking plates 30 are normally urged by spring member 33 so that each of the forward end claw 30a thereof is projected to one side outer portion of the tape end draw-out port 4.

As shown in FIG. 8, each of the opposite side walls 15 of the main casing 1 facing the tape draw-out port 4 is constituted by butting a side wall upper half 15a against a side wall lower half 15b, respectively provided on the upper casing 1a and a lower casing 1b. At each of the side wall lower half 15b of the lower casing 1b corresponding to the position where the claw 30a of the locking plate 30 projects, a notch 34 is provided. The outer side of each of the notches 34 is closed by a wall piece 35 extending outward from the side wall upper half 15a of the upper casing 1a. Thus, by the lower edges of the wall pieces 35 and the lower edges of the side walls 6 of the pocket 5, rising of the locking plates 30 from the recesses 32 is restricted by contact.

Figure 4:
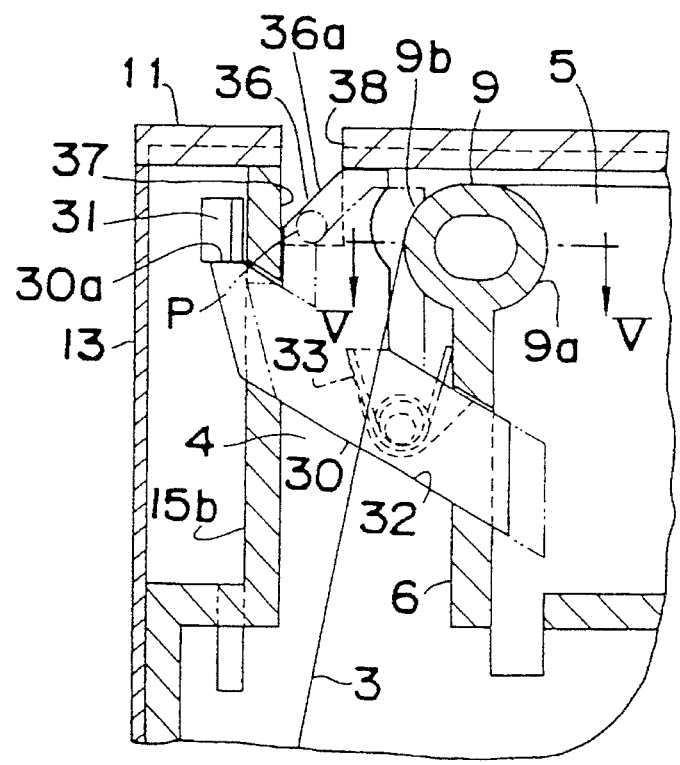
FIG. 4 is a fragmentary top plan view in section showing, on an enlarged scale, a lock mechanism portion for a slider member in the tape cartridge of FIG. 2.

As shown in FIGS. 4 and 8, in each of the locking plates 30, a cam piece 36 having an inclined edge 36a is integrally formed to extend forward from a front edge of the locking plate 30. Meanwhile, at the forward edge on the inner bottom face of each tape draw-out port 4, and at the lower edge of the front wall 11a of the front lid 11, operating grooves 37 and 38 for permitting entry of releasing pins at the side of a video tape recorder are provided in a communicated state. Therefore, upon loading of the tape cartridge on the tape recorder, the releasing pins P (FIG. 4) at the side of the video tape recorder enter the operating grooves 37 and 38 from the front portions thereof, and contact and depress the inclined edge 36a of the cam pieces 36, as shown in FIG. 4. Thus, as shown in imaginary lines in FIG. 4, the locking plates 30 are displaced in the direction of the pocket 5 against the spring members 33, whereby the forward end claws 30a are released from the engagement with the projections 31 of the slider member 13, which is then allowed to be displaced rearwardly.

Figure 7:
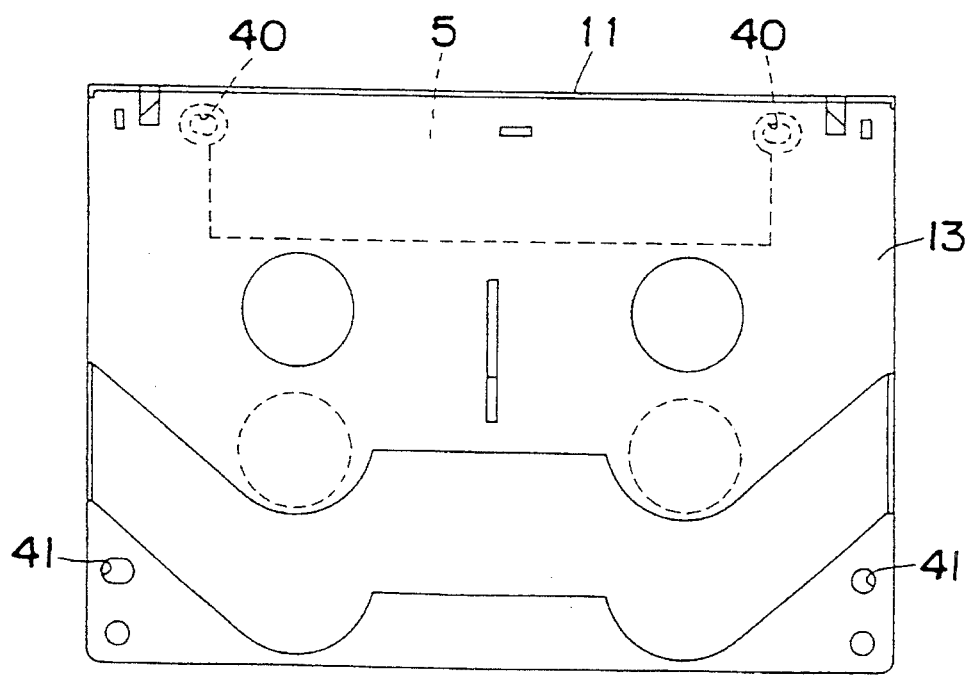
FIG. 7 is a bottom plan view of the tape cartridge in FIG. 2.

As shown in FIG. 7, in order to correctly set the main casing 1 of the tape cartridge in a holder (not shown) at the side of the tape recorder, positioning reference holes 40 and 41 to be fitted .with reference pins at the tape recorder side are provided at four places in total in front and rear portions of the under face at the outer side of the main casing 1. The front two positioning pins 40 are formed in positions corresponding to the portions immediately below the tape guides 9. In other words, the lower inner ends of the hollow tape guides 9 are utilized for the reference holes 40. By this construction, the problem that the positioning reference holes are difficult to be provided at the front portion due to the fact that the sliding region of the slider member 13 for selective opening and closing of the under face of the pocket 5 is required at the under face of the main casing 1, may be simultaneously solved.

Figure 6:
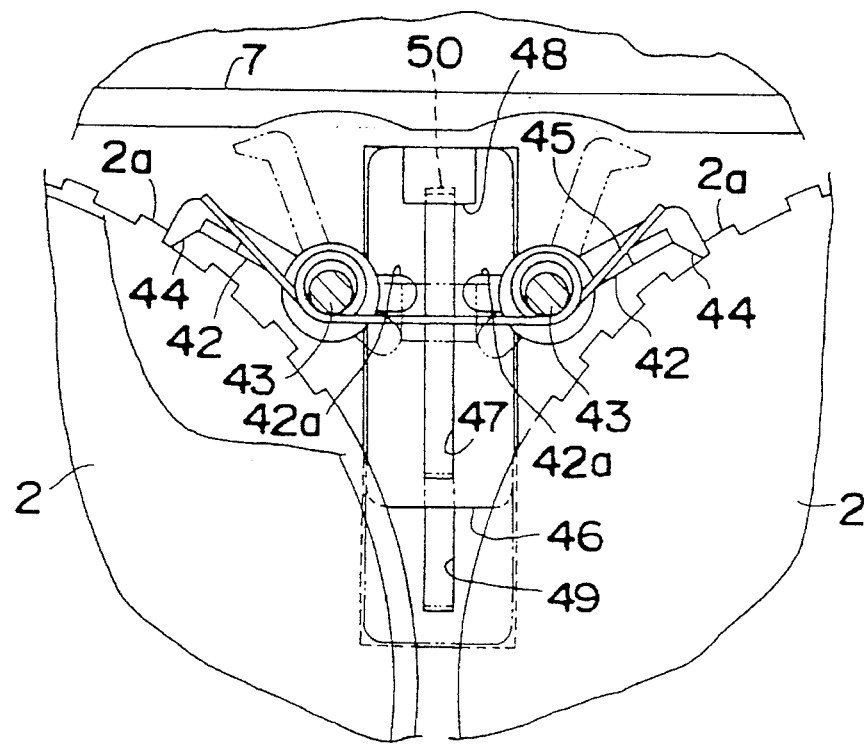
FIG. 6 is a fragmentary top plan view showing, on an enlarged scale, a reel locking mechanism portion of the tape cartridge in FIG. 2.

The tape cartridge of the present invention is also provided with a locking mechanism for preventing the reels 2 from rotation during non-use period. As shown in FIGS. 6 and 8, for the reel locking mechanism, at a forward position between the reels 2 on the inner bottom face of the main casing 1, a pair of support shafts 43 are erected on the bottom wall of the main casing 1, and reel locking members 42 are rotatably fitted onto the shafts 43 from above for horizontal pivotal movement. Each of the reel locking members 42 is normally urged in a locked posture direction where a claw 44 at its end portion is engaged with corresponding engaging teeth 2a of the reel 2, by a spring member 45.

There is also provided a releasing member 46 for simultaneously releasing the respective reel lock members 42 from retained state against rotation. The releasing member 46 is movably disposed in forward and backward directions between the left and right side reel locking members 42 on the inner bottom face of the main casing 1, and is formed into a strip plate shape having an-elongated hole 47 formed in the forward and backward directions, with a releasing projection 48 being integrally formed to project upward from its upper face at the forward end side. In the bottom wall of the main casing 1 in which the releasing member 46 is incorporated, an elongated through-hole 49 is formed between the shafts 43.

Meanwhile, an operating projection 50 is provided at generally a central portion toward the front side on the upper surface of the slider member 13, and the projection 50 is engaged with the elongated hole 47 of the releasing member 46 through the through,hole 49 from the bottom of the main casing 1.

By the above, arrangement, when the tape cartridge is loaded on the tape recorder, a releasing claw (not shown) at the side of the tape recorder contacts a forward end portion 13c of the slider member 13 through notches 51 (FIG. 8) formed in the lower edge of the front lid 11, and after the sliding lock of the slider member 13 has been released as described earlier, the slider member 13 is pushed open towards the rear portion of he main casing 1 against the spring member 27. At approximately an intermediate position in the rearward displacement Of the slider member 13, the operating projection 50 engages the rear end 47a of the elongated hole 47 of the releasing member 46 (FIG. 3(B)), and thereafter, displaces the releasing member 46 backwards as the slider member 13 moves still more rearward (FIG. 3(C)). In the vicinity of an end position of the backward movement of the releasing member 46, the releasing projection 48 depresses the projections 42a of the left and right reel locking members 42, and by this depressing action, both of the reel locking members 42 rotate about the respective support shafts 43, whereby the claws 44 are disengaged from the engaging teeth 2a of the reels 2, thus allowing the reels 2 to be rotated (two-dotted chain lines in FIG. 6).

After the slider member 13 has been displaced for opening, with the respective reels 2 released from locking, the entire tape cartridge is caused to descend within the video tape recorder, and the positioning pins at the video tape recorder side are fitted into the front and rear positioning reference holes 40 and 41, and thus, the tape cartridge is positioned and loaded on the video tape recorder. Simultaneously, the front lid 11 is rotated upward for opening about the shafts 14 against the spring member 17 by the contacting action with the lid opening member at the side of the video tape recorder. Upon upward opening rotation of the front lid 11 about the shafts 14, the upper lid 12 is displaced rearward in parallel for opening as the sliding pieces 23 at the forward ends of the arm pieces 22 are subjected to the sliding movement rearward along the guide grooves 24.

In use where the front lid 11 and the upper lid 12 are opened, the pocket opening height H may be enlarged and the head cylinder D can be directed deep into the pocket 5, as shown in FIG. 3(C). With respect to the relative positional relation between the head cylinder D and the height direction of the tape cartridge, the tape cartridge can be set at a low position towards a downward direction with respect to the head cylinder D. This means that within the video tape recorder, the head cylinder D and surrounding mechanism thereof may be disposed in a state where they are as close to a driving shaft for the reels 2 as possible, and the arrangement serves for the compact size of the video tape recorder by that extent.

When the head cylinder D is disposed deep into the pocket 5, reduction of a flat area in the mechanism for the entry of the head cylinder D may be achieved. Meanwhile, the magnetic tape 3 is wound onto the outer peripheral portions of the tape guides 9 directed towards the pocket 5 so as to be stably guided onto the head cylinder D for movement thereover.

Second Embodiment

FIGS. 9 to 13 show a tape cartridge according to a second embodiment of the present invention, in which the front lid 11, the upper lid 12 and the slider member 13 are attached to the main casing substantially in the similar manner as in the first embodiment, with like parts being designated by like reference numerals for brevity of explanation.

Figure 11:
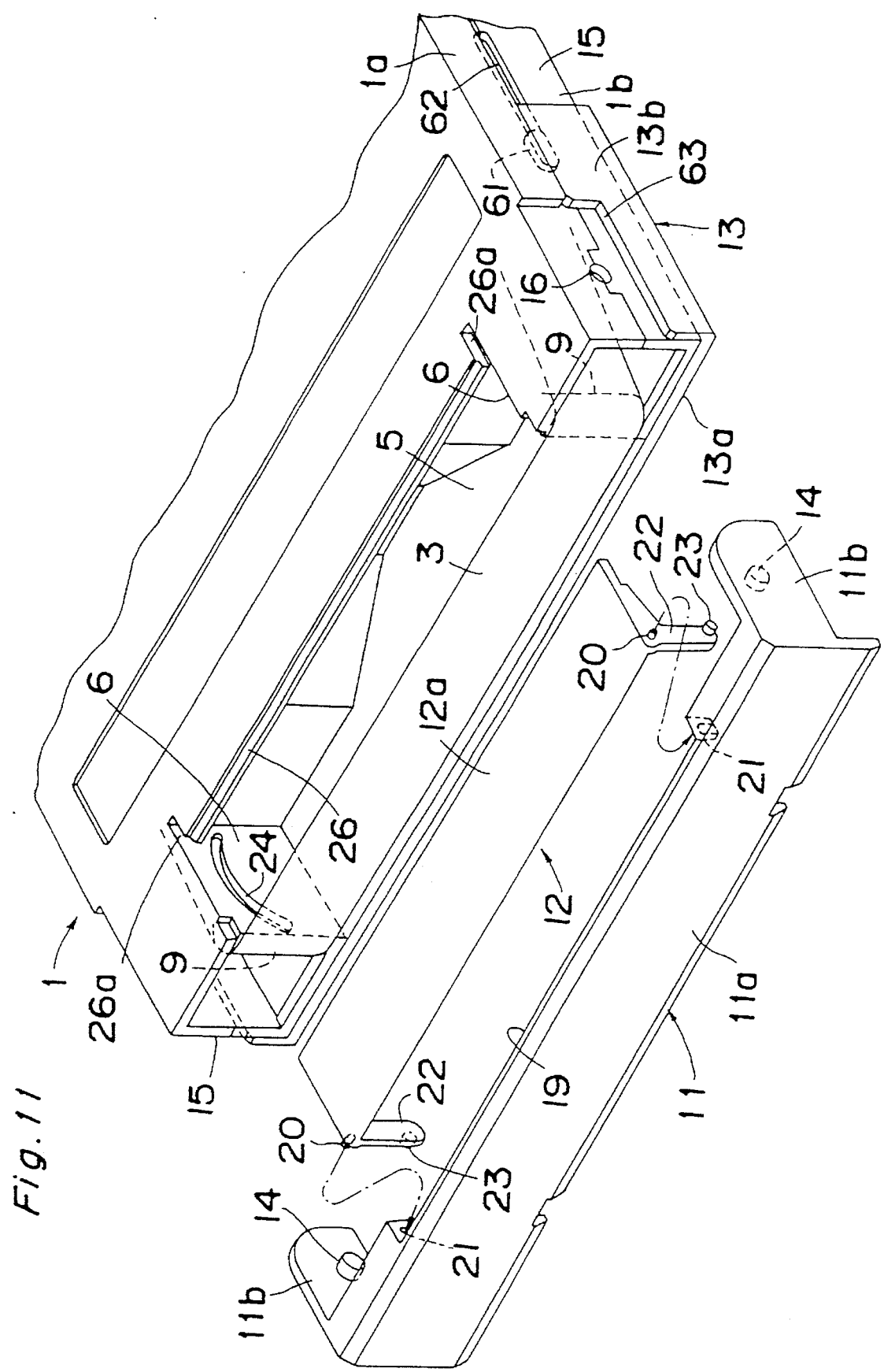
FIG. 11 is a fragmentary exploded perspective view of the tape cartridge in FIG. 9.
Figure 12:
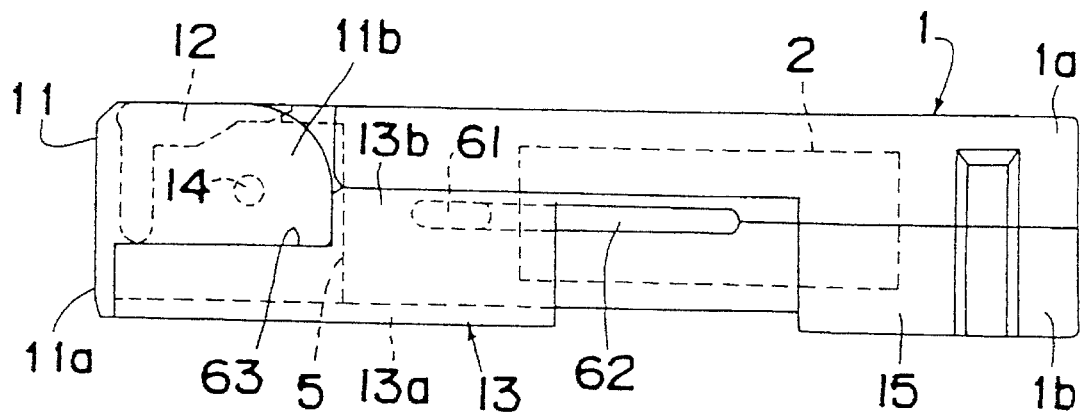
FIG. 12 is a side elevational view of the cartridge in FIG. 11, in a state where its lid is closed.
Figure 13:
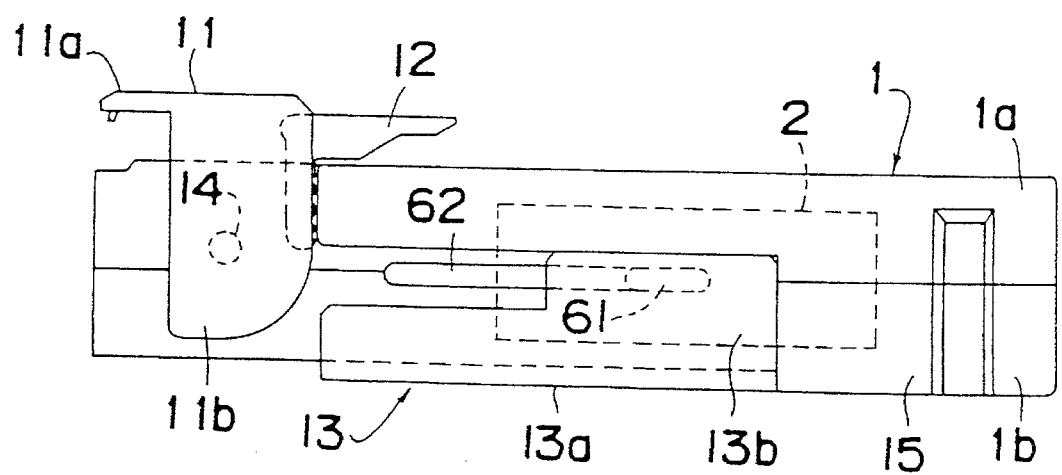
FIG. 13 is a view similar to FIG. 11, which particularly shows the state where its lid is opened.

However, as shown in FIG. 11, the front wall 11a of the front lid 11 and the main face plate 12a of the upper lid 12 are pivotally connected to each other by pin holes 21 provided at the sides of the front wall 11a and pins 20 provided at the side of the main face plate 12a. Meanwhile, as shown in FIGS. 11 and 12, projections 61 are extended inwardly on the inner faces of the side walls 13b of the slider member 13, and corresponding guide grooves 62 are formed in the forward and backward directions between the joining faces of the upper and lower casings 1a and 1b on the opposite side walls 15 of the main casing 1, while the projections 61 are slidably engaged in the guide grooves 62 for sliding movement in the forward and backward directions. Furthermore, the side walls 13b of the slider member 13 are formed, at forward edge sides thereof, with stepped portions 63 (FIGS. 11 and 12), whereby when the front lid 11 is in a closed state, lower edges of the side walls 11b of the front lid 11 are respectively received (FIG. 12) by the stepped portions 63 so as to restrict the upward rotation of the front lid 11 by contact therebetween. By this arrangement, when the slider member 13 is displaced rearward for opening, the stepped portions 63 escape rearward from the lower edges of the side walls 11b, and-the front lid 11 may be freely pivoted upward for opening as described earlier.

Third Embodiment

Figure 14:
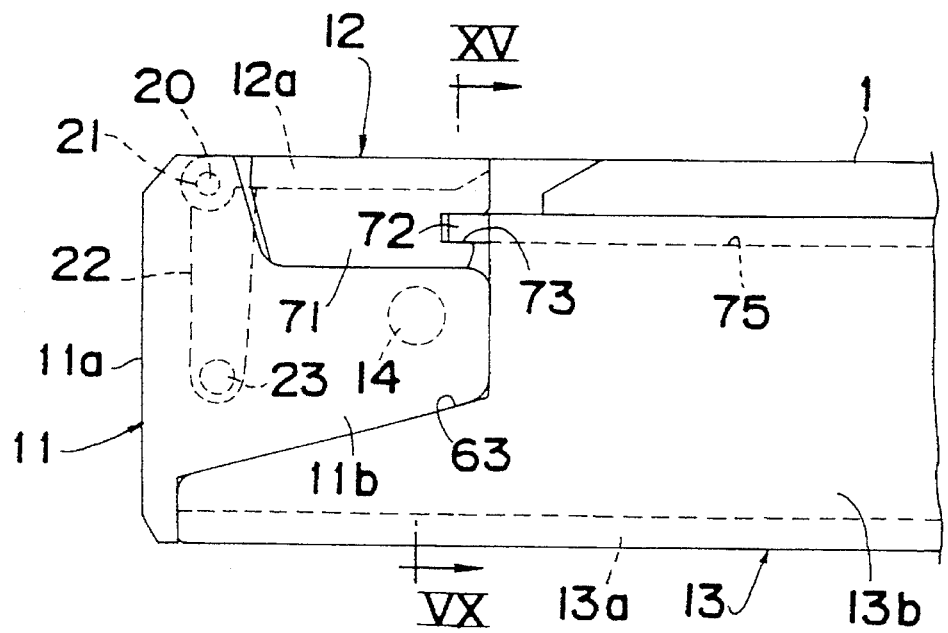
FIG. 14 is a fragmentary side elevational view of a tape cartridge according to a third embodiment of the present invention in a state where its lid is closed.
Figure 15:
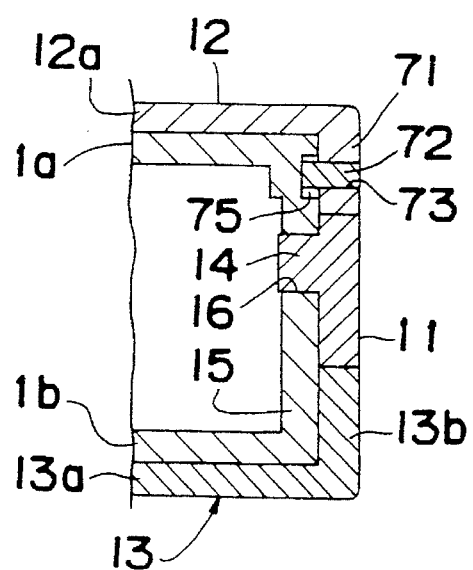
FIG. 15 is a cross section taken along the line XV—XV in FIG. 14.

FIGS. 14 and 15 show a tape cartridge according to a third embodiment of the present invention in which the arrangement around the upper lid 12 has been modified.

In this embodiment, the main face plate 12a of the upper lid 12 is laterally elongated to be long, and as shown in FIGS. 14 and 15, the upper lid 12 is provided at opposite side edges of the main face plate 12a, with walls 71 depending downward therefrom along outer side faces of the side walls 15 of the main casing 1, and between the side walls 13b of the slider member 13 and the depending walls 71, there is provided means for preventing plays or looseness of the upper lid 12 in ! the lid closed state is provided.

More specifically, engaging projections 72 are formed at upper front edges of the side walls 13b of the slider member 13 so as to project forward therefrom, and the depending walls 71 of the upper lid 12 are formed, at rear edges thereof, wit groove-like engaging concave portions 73 in which the engaging projections 72 are respectively fitted from the rear side. Thus, by the engagement between the engaging projections 72 and the engaging concave portions 73, looseness of the upper lid 12 during non-use can be prevented. By the above arrangement, when the tape cartridge is taken out of the video tape recorder, the slider member 13 slides into the forward closed position after the front lid 11 and the upper lid 12 have been returned to the closed state. In this case, the respective engaging projections 72 fit into the engaging concave portions 73 from the rear side for engagement, thereby to stop play in the vertical direction. Therefore, such a trouble that the tape cartridge can not be drawn out from the video tap recorder by the rising at the rear end side of the upper lid 12, may be advantageously prevented, and this favorable state can be maintained even during non-use period.

On the contrary, when the tape cartridge is to be loaded onto the video tape recorder, by the rearward sliding of the slider member 13, the engaging projections 72 are disengaged from the respective concave portions 73, and thus, the upper lid 12 may be freely opened. Escape grooves during formation of the engaging projections 72 are indicated by Numeral 75. Since other constructions of the tape cartridge for this embodiment are generally similar to those of the previous embodiments, detailed description thereof is abbreviated for brevity of explanation, with like parts being designated by like reference numerals.

Fourth Embodiment

FIGS. 16 to 20 show the tape cartridge according to a fourth embodiment of the present invention, in which the front lid 11, the upper lid 12, and the slider member 13 are mounted on the main casing 1 substantially in the similar manner as in the first embodiment, and like parts are designated by like reference numerals for brevity of explanation.

In the fourth embodiment, it is first intended when the front lid 11 and the upper lid 12 are in the closed state, to prevent formation of a clearance for the dust to enter the connected portion between the forward edge of the main face plate 12a of the upper lid 12 and the upper edge of the front wall 11a of the front lid 11 in the portion where the pocket 5 is present.

Figure 16:
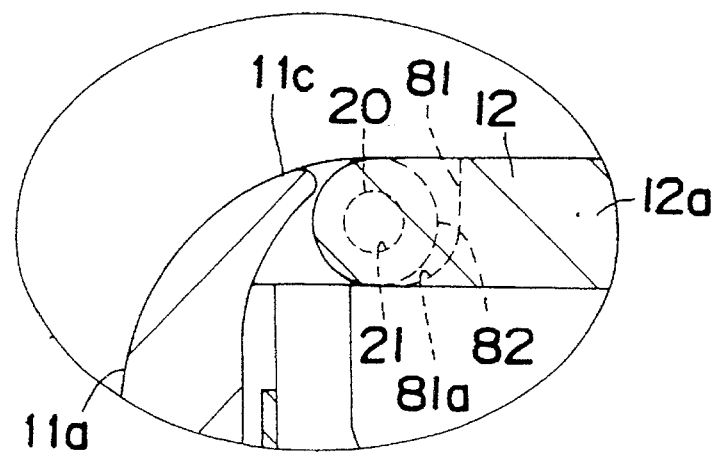
FIG. 16 is a fragmentary side sectional view of a tape cartridge according to a fourth embodiment of the present invention, with some portions thereof shown as enlarged.
Figure 16:
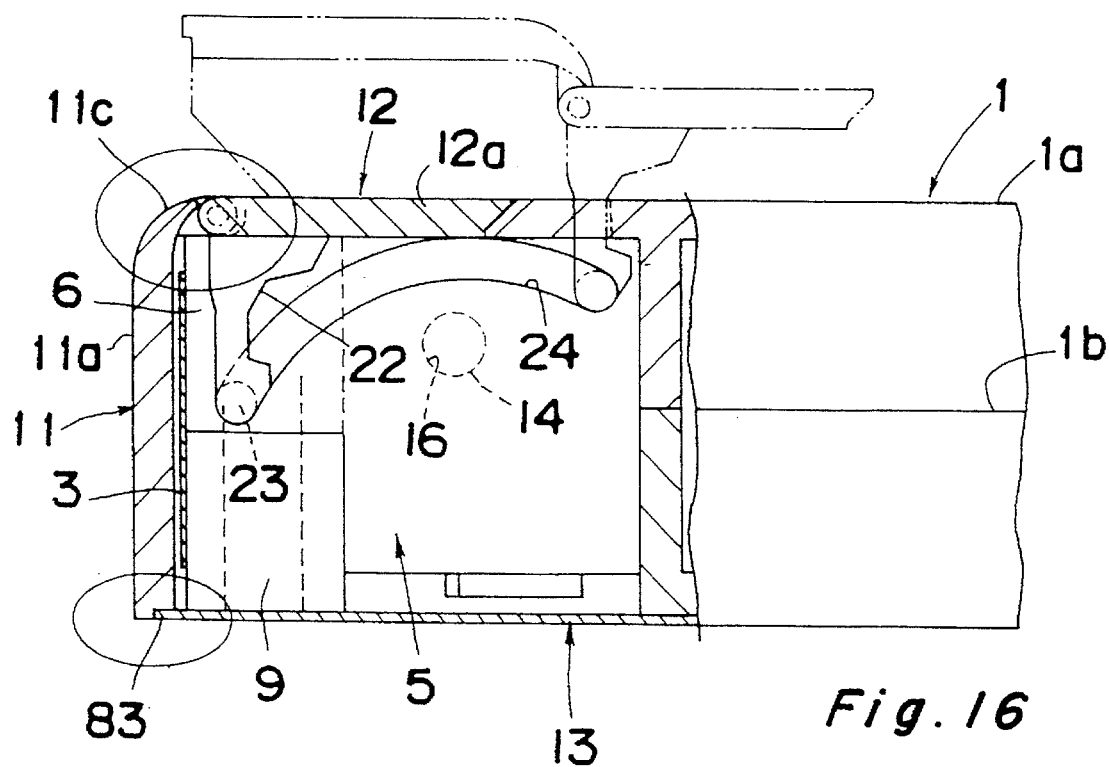
Figure 16:
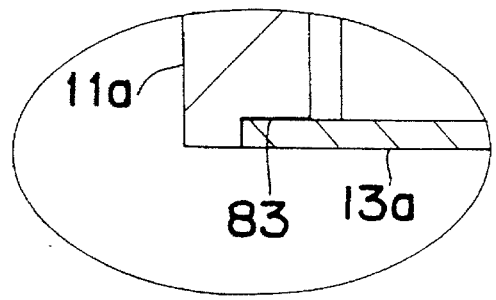
Figure 17:
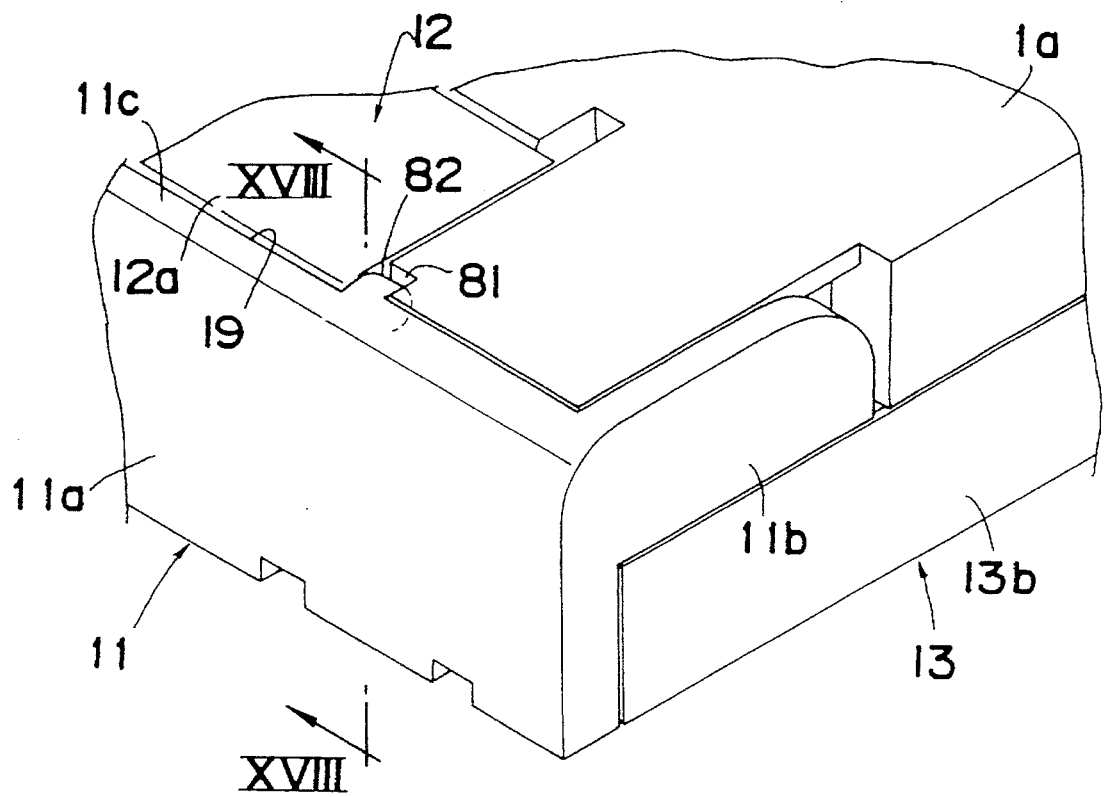
FIG. 17 is a fragmentary perspective view showing an essential portion of the tape cartridge in FIG. 16.
Figure 18:
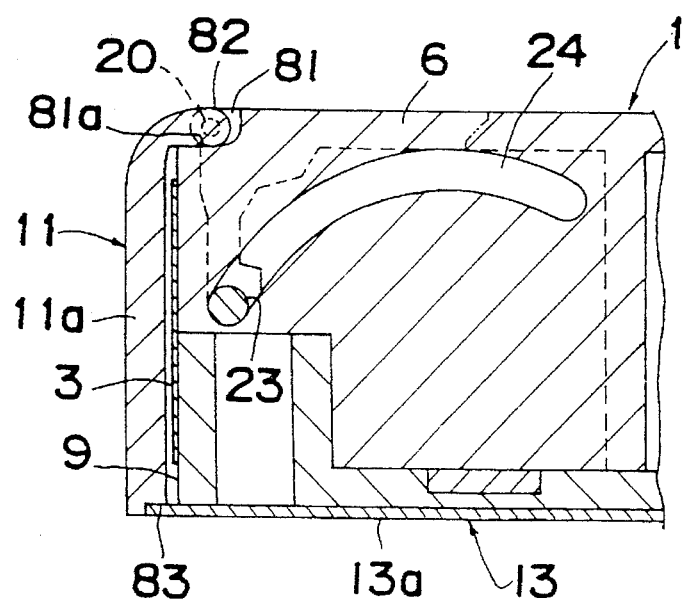
FIG. 18 is a fragmentary cross section taken along the line XVIII—XVIII in FIG. 17.
Figure 19:
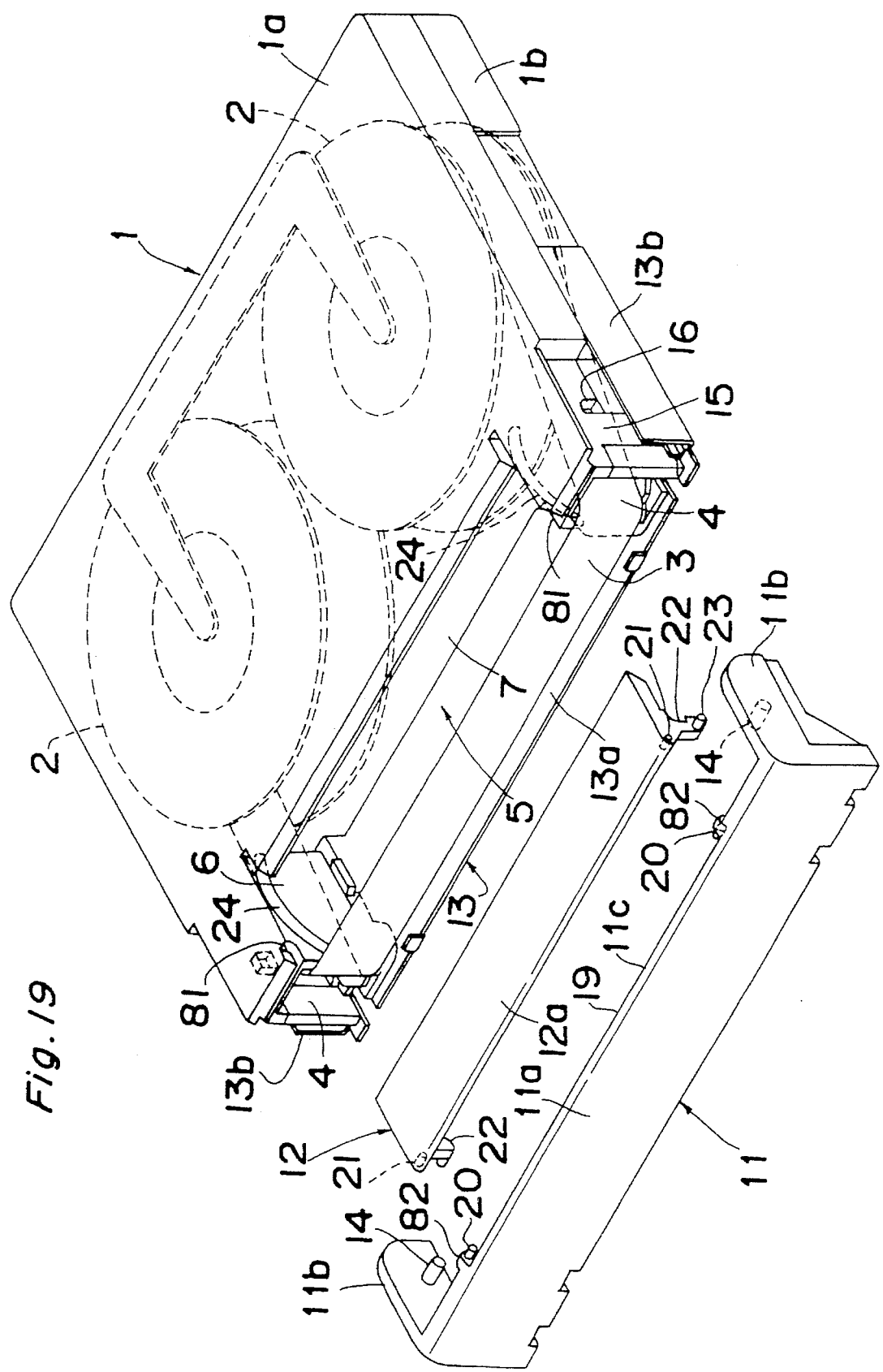
FIG. 19 is an exploded perspective view of the tape cartridge in FIG. 16.
Figure 20:
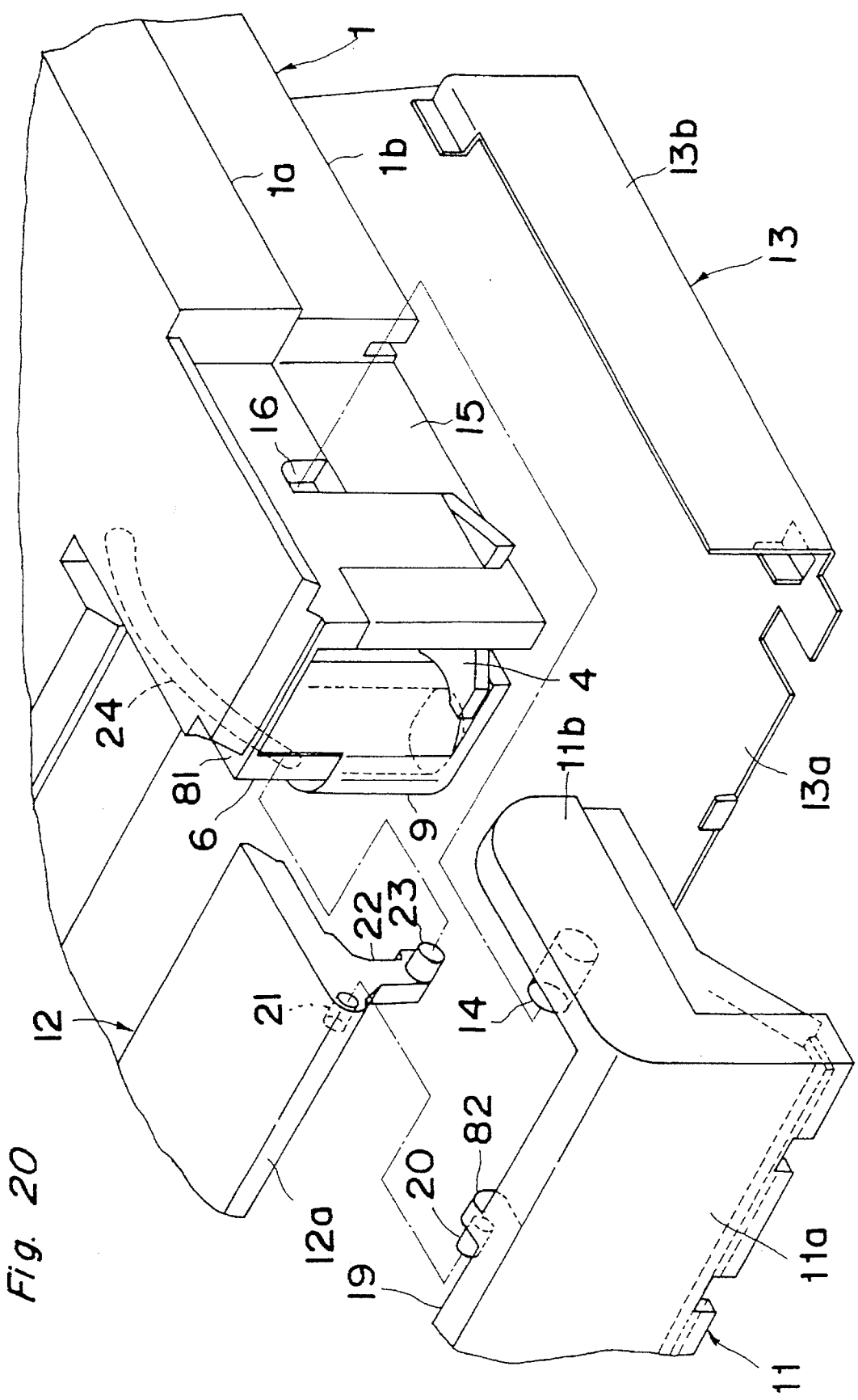
FIG. 20 is a fragmentary perspective view showing, on an enlarged scale, essential portions of the tape cartridge in FIG. 19.

For this purpose, as shown in FIG. 16, at the upper edge of the cut-out portion 19 at the front wall 11a of the front lid 11, a covering wall 11c for covering the forward edge of the main face plate 12a of the upper lid 12 from the front face side is integrally formed to extend upward and rearward.

It is desirable that the upper edge of the covering wall 11c is set to be as close to the forward edge of the main face plate 12a as possible without any interference to the pivotal movement of the upper lid 12 about the pins 20. Therefore, the forward edge of the main face plate 12a of the upper lid 12 is formed into a convex arcuate shape in a longitudinal side sectional view as in a semi-circle drawn about the pin 20, and thus, the covering wall 11c is formed, in its inner face, into a concave curved face generally following the convex arcuate shape in cross section of the main face plate 12a.

Subsequently, although the front lid 11 is supported by the left and right shafts 14 with respect to the main casing 1, when an external load is applied to the front wall 11a of the front lid 11 from above or from a front portion, the front wall laterally long tends to be deflected and deformed, and by such deformation, a clearance may be formed between the front lid 11 and the main casing 1 or the upper lid 12 for possible entry of dust.

In order to prevent the deformation of the front lid 11 as described above, as shown in FIGS. 17 and 18, on the upper wall of the main casing 1, i.e., on the upper side of the front edge of each of the opposite side walls 6 of the pocket 5, recesses 81 open at the upper and front portions are provided so that left and right boss portions 82 having the pins 20 at the side of he front lid 11 enter the recesses 81 from above in the closed state of the front lid 11 and the upper lid 12, thereby o receive each of the boss portions 82 at the inner bottom face 81a of the recess 81. In other words, the front lid 11 laterally long is so arranged that its front wall 11a may be supported at the left and right two points by the recesses 81 at the side of the main casing 1 through the boss portions 82 so as not to be easily deformed.

Furthermore, for close contact without forming any clearance with respect to the front lid 11 in the state where the slider member 13 is closed, as shown in FIG. 16, in a lower edge inner face of the front wall 11a of the front lid 11, a recess potion 83 is provided to extend laterally so that a forward edge of the bottom wall 13a of the slider member 13 engages the recess portion 83 in the state where front lid 11 is closed, and slider member 13 engages the recess portion 83 in the state where front lid 11 is closed, and slider member 13 advances forwards to close the under face of the pocket 5 (FIG. 16). By this arrangement also, entry of dust at such portion is prevented for improving the dust prevention effect as a whole.

Fifth Embodiment

FIGS. 21 to 26 show the tape cartridge according to a fifth embodiment of the present invention, in which the front lid 11, the upper lid 12 and the slider member 13 are mounted on the main casing 1 substantially in the same manner as in the first embodiment, with like parts being designated by like reference numerals for brevity of explanation.

In this embodiment, the guide means provided between the main casing 1 and the upper lid 12 for guiding the upper lid 12 so that the main face plate 12a thereof movements to the upper face rear portion of the pocket 5, following the upward opening rotation of the front lid 11, is different in construction from that in the previous embodiment.

Figure 21:
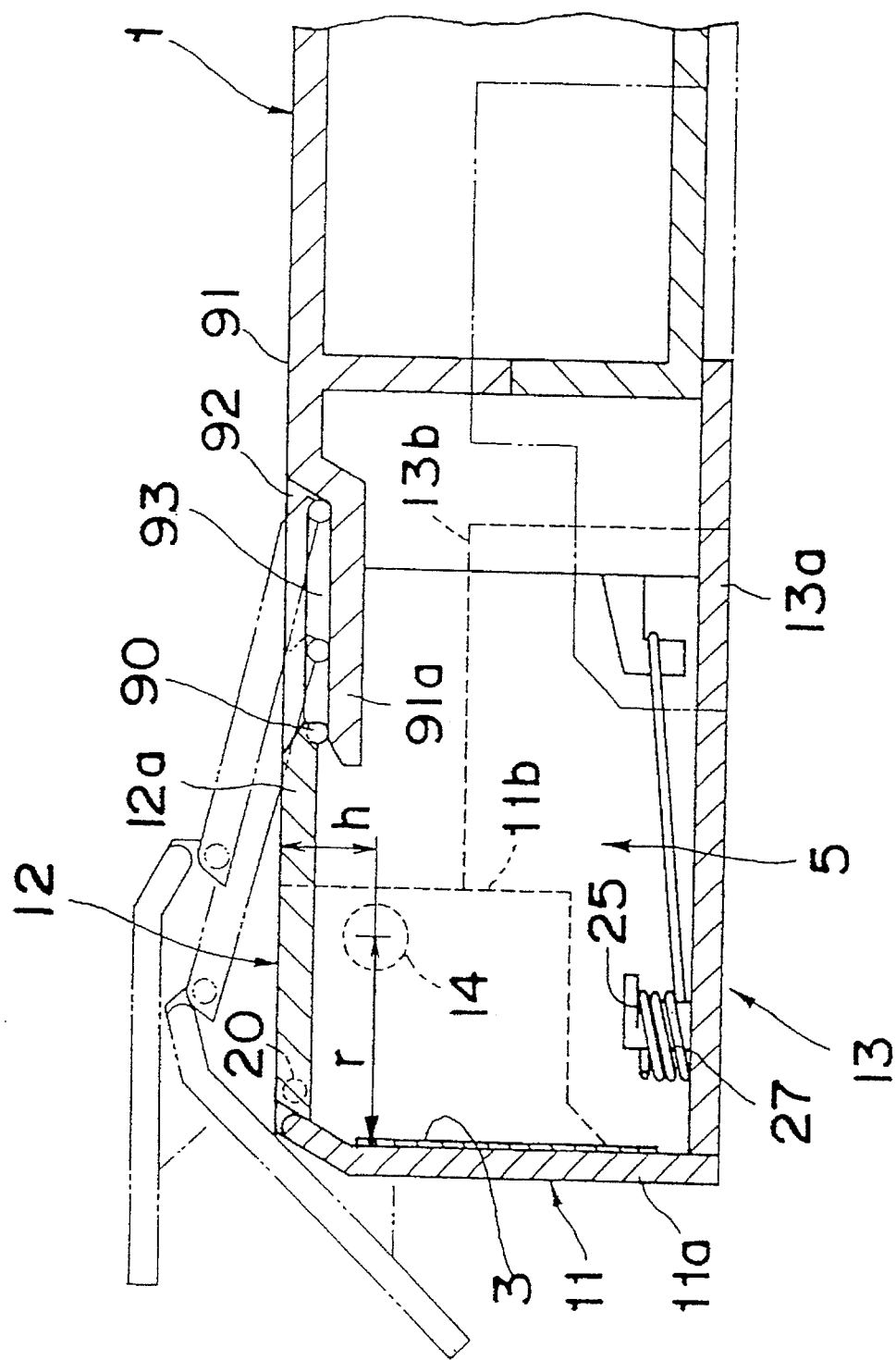
FIG. 21 is a fragmentary side sectional view of a tape cartridge according to a fifth embodiment of the present invention, in a state where its lid is closed.
Figure 26:
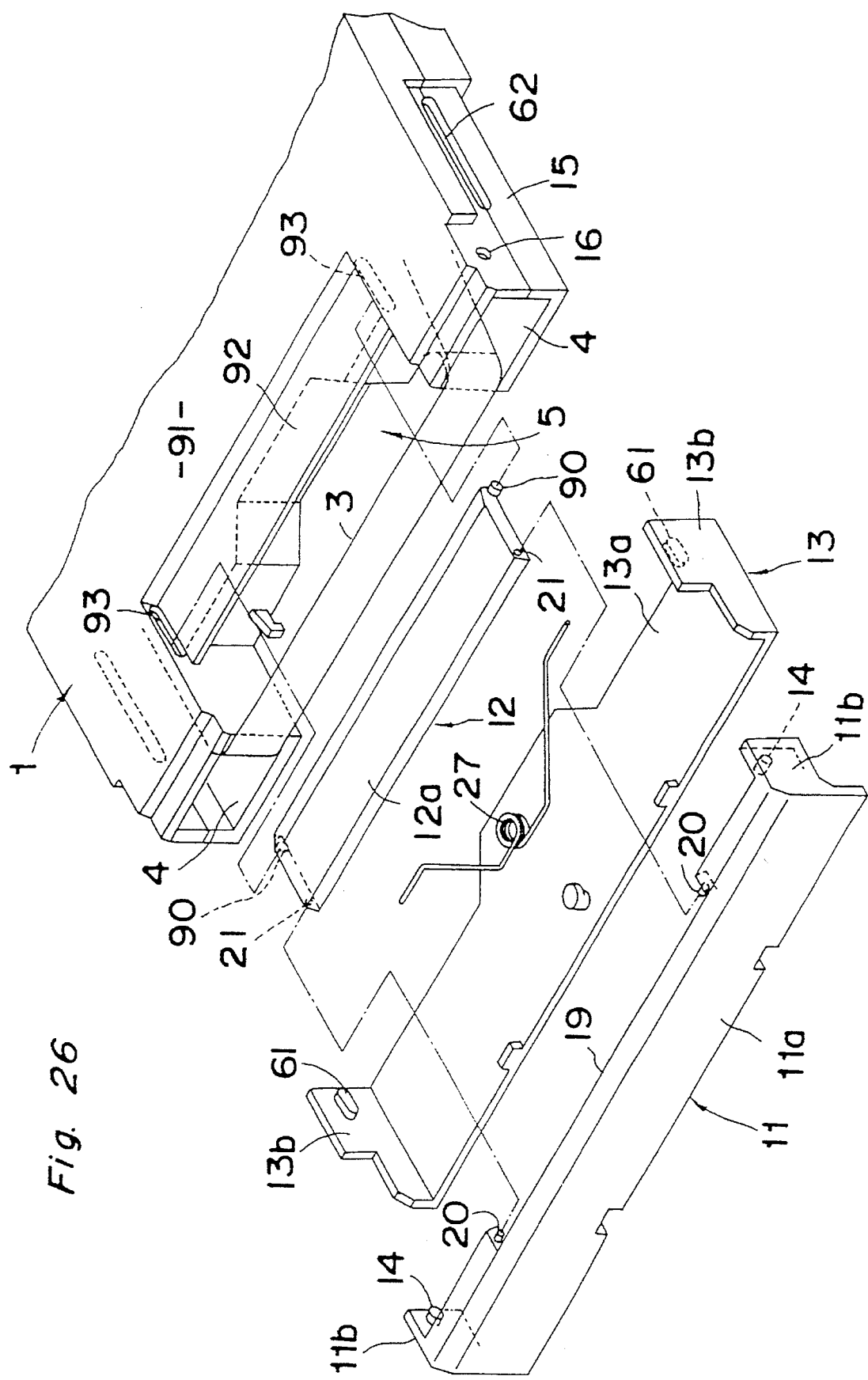
FIG. 26 is a fragmentary exploded perspective view of the tape cartridge in FIG. 21.

As shown in FIGS. 21 and 26, for the guide means, sliding pieces 90 are provided at the rear edges side of the main face plate 12a of the upper lid 12, and in the position where the pocket 5 is present, at the forward edge of the upper wall 91 of the main casing 1, an eaves wall 91a is formed to extend therefrom for closing the upper face at the inner rear side of the pocket 5, and on the upper face of the eaves wall 91a, a recess 92 is formed in a stepped manner at the rear portion of the upper face for the opening of the pocket 5, and guide grooves 93 elongated in the forward and backward directions are provided at left and right sides in the recess 92, with the sliding pieces 90 being slidably engaged respectively in the guide grooves 93 for displacement in the forwards and backwards directions.

Figure 22:
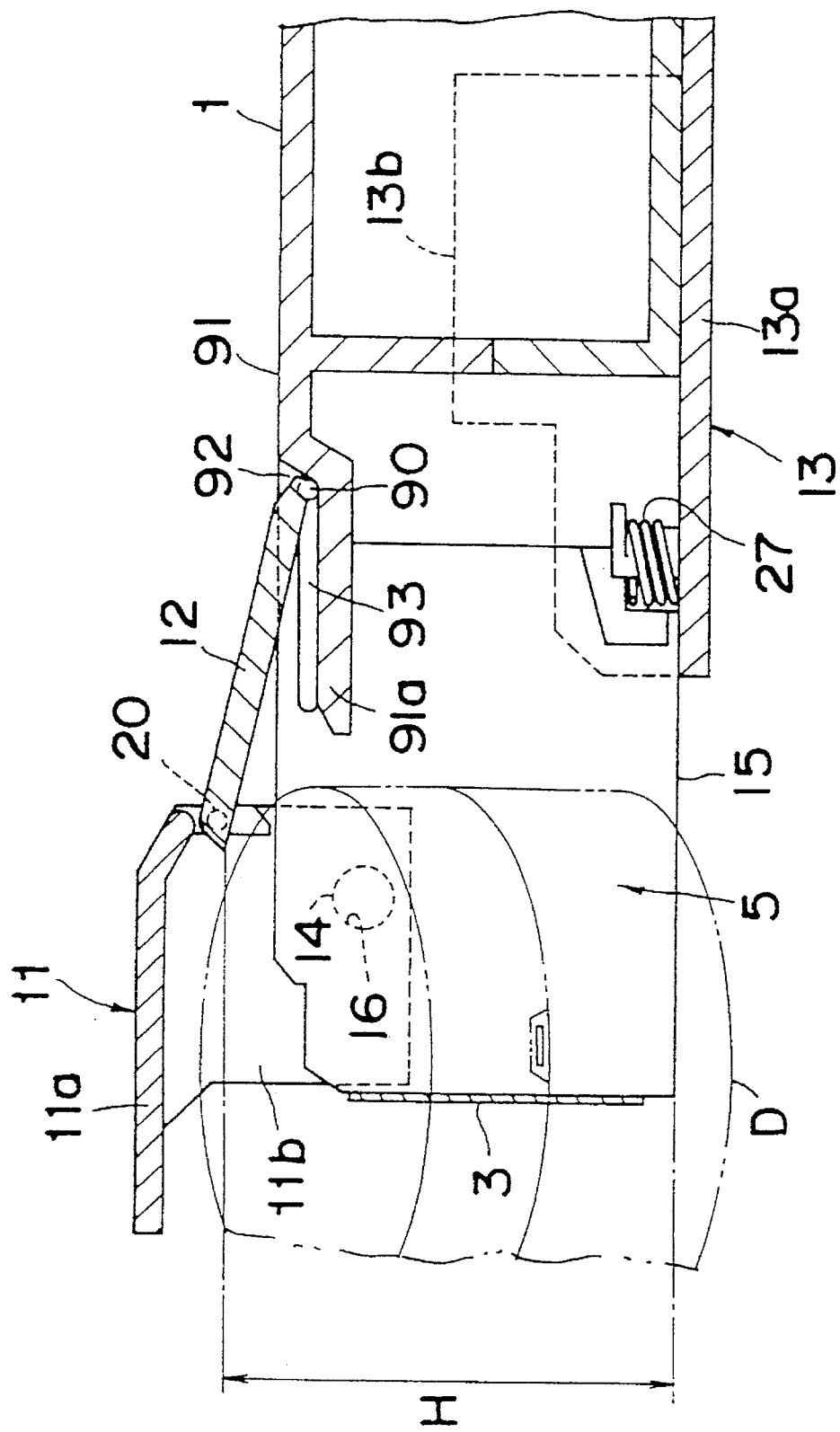
FIG. 22 is a view similar to FIG. 21, which particularly shows the state where its lid is opened.
Figure 23:
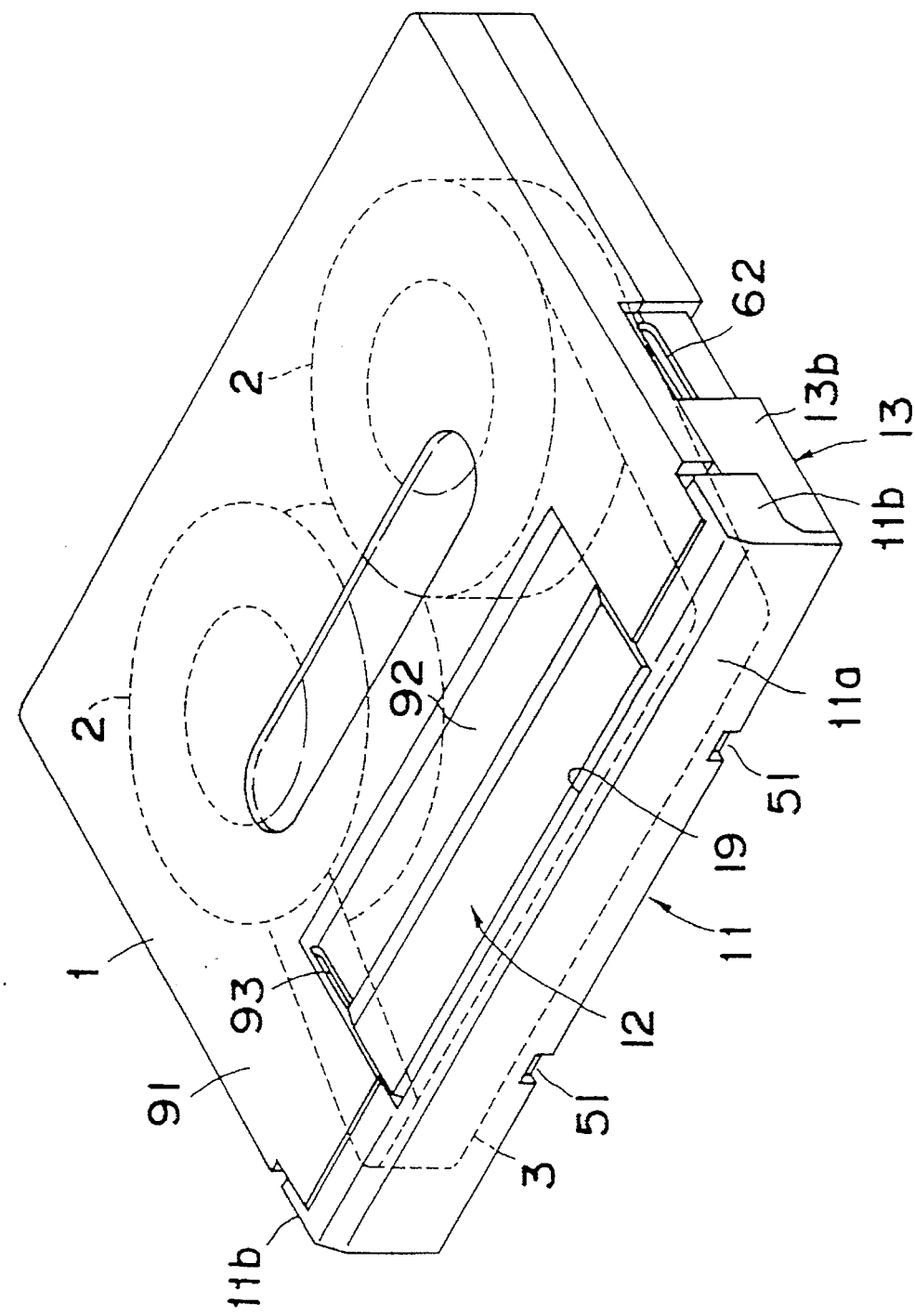
FIG. 23 is a perspective view of the tape cartridge in FIG. 21
Figure 24:
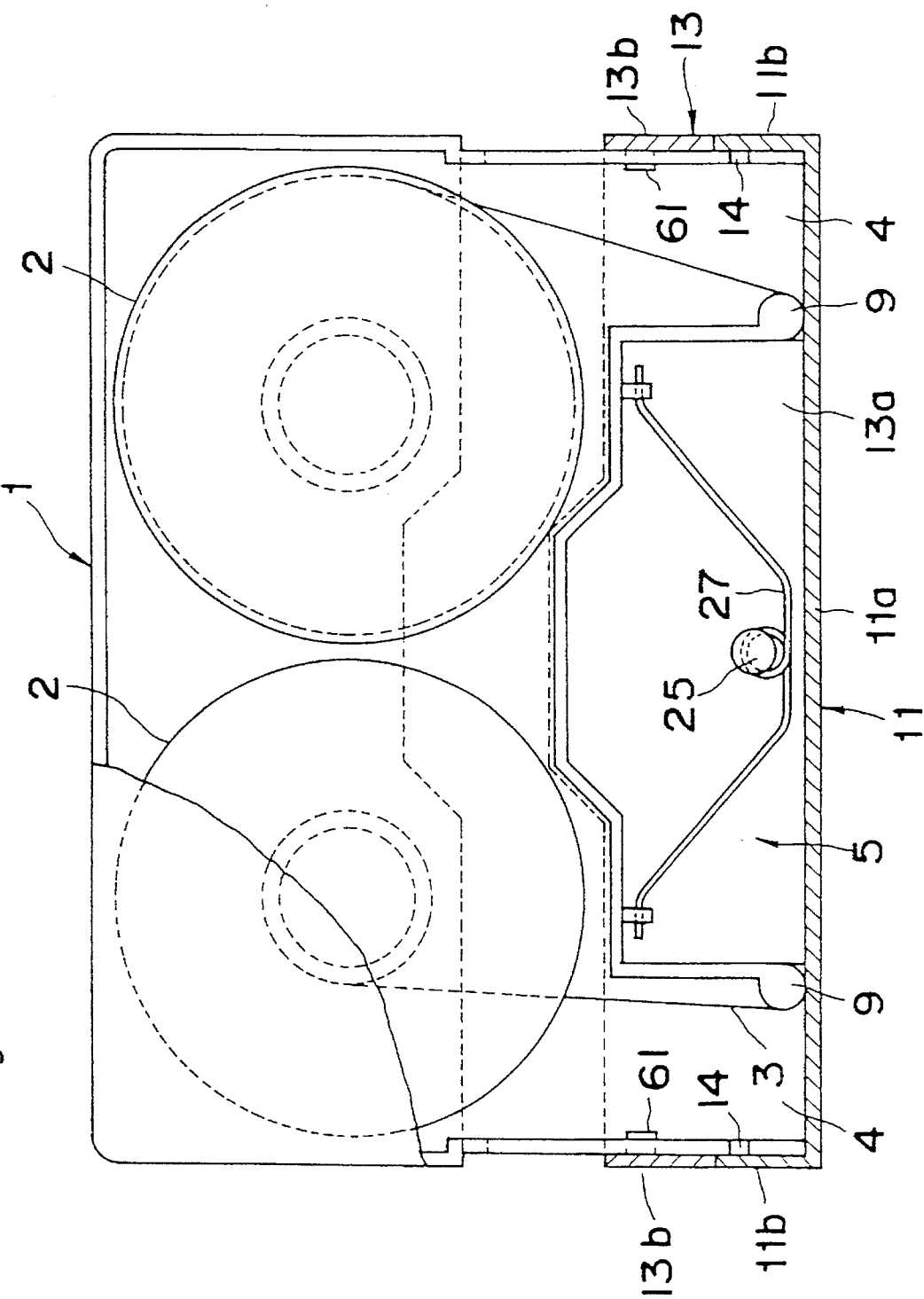
FIG. 24 is a top plan view, partly broken away and in section, of the tape cartridge in FIG. 21, showing an internal construction thereof.
Figure 25:
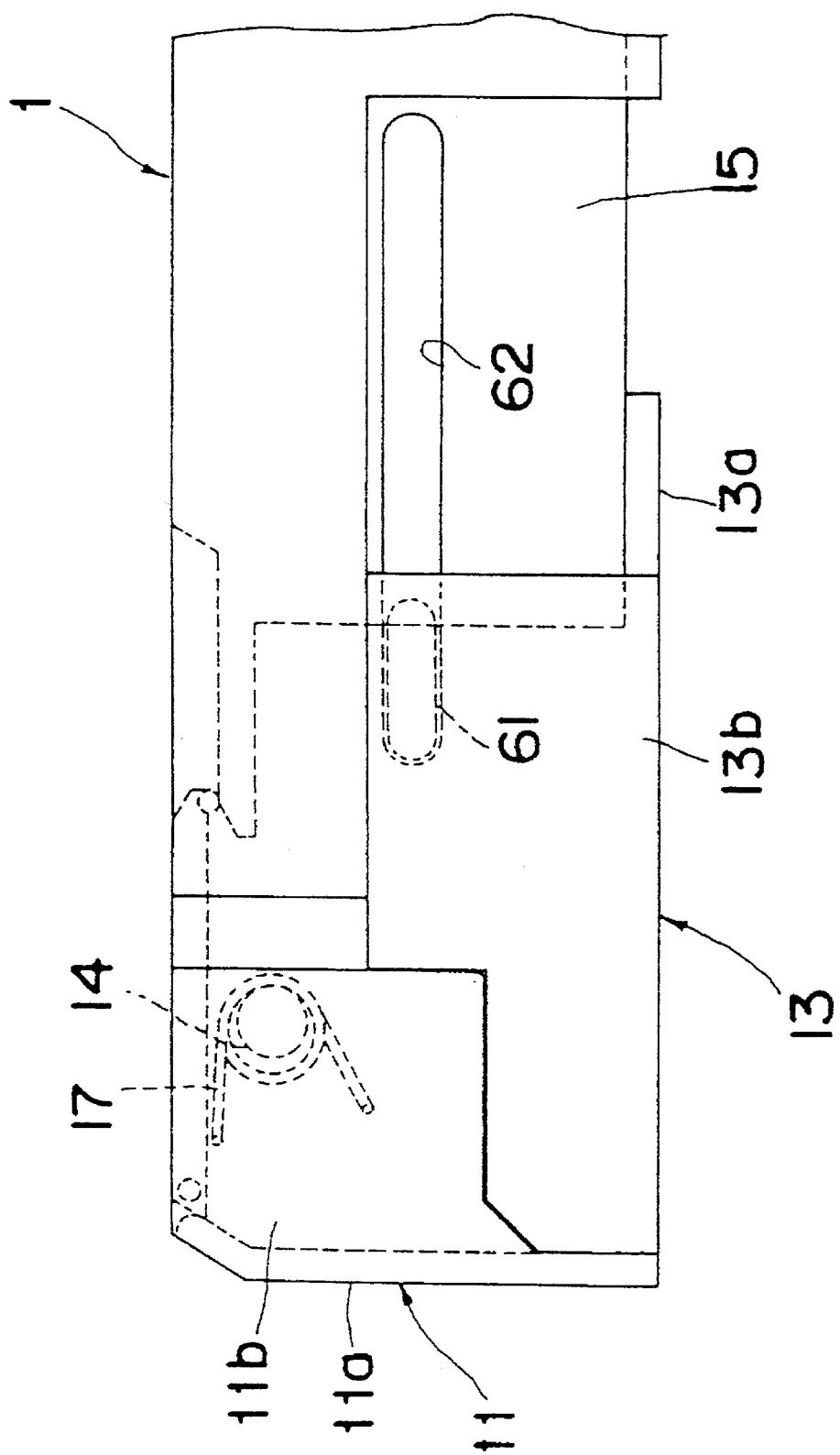
FIG. 25 is a fragmentary side elevational view of the tape cartridge in FIG. 21.

By the above arrangement, when the upper lid 11 rotates upward for opening about the shafts 14, the sliding pieces 90 slide backwards along the guide grooves 93, and the upper lid 12 is pushed backwards, with the forward edge of its main face plate 12a inclined slantwise upward from the upper face of the pocket 5 and finally, movements onto the recess 92 at the rear portion from the upper face of the pocket 5, as shown in FIG. 22. In the using state where the front lid 11 and the upper lid 12 are opened, the effective opening height H of the pocket 5 is enlarged by the withdrawal of the upper lid 12 rearward as shown in FIG. 22 and thus, the head cylinder D may be allowed to enter deep into the interior of the pocket 5.

It is to be noted here that, since each of the sliding pieces 90 is engaged with the guide grooves 93, in the state where the upper lid 12 is closed, as shown in the solid lines in FIG. 21, there is no possibility that the rear edge of the main face plate 12a of the upper lid 12 is undesirably raised. Moreover, the main face plate 12a in the recess 92 does not protrude on the upper face of the upper wall 91 of the main casing 1 to a large extent, even during the lid closed state. Therefore, the inconvenience that the rear edge side of the main face plate 12a is raised by external impulses, etc., during use, and the main casing 1 can not be drawn out may be advantageously prevented.

Sixth Embodiment

Figure 27:
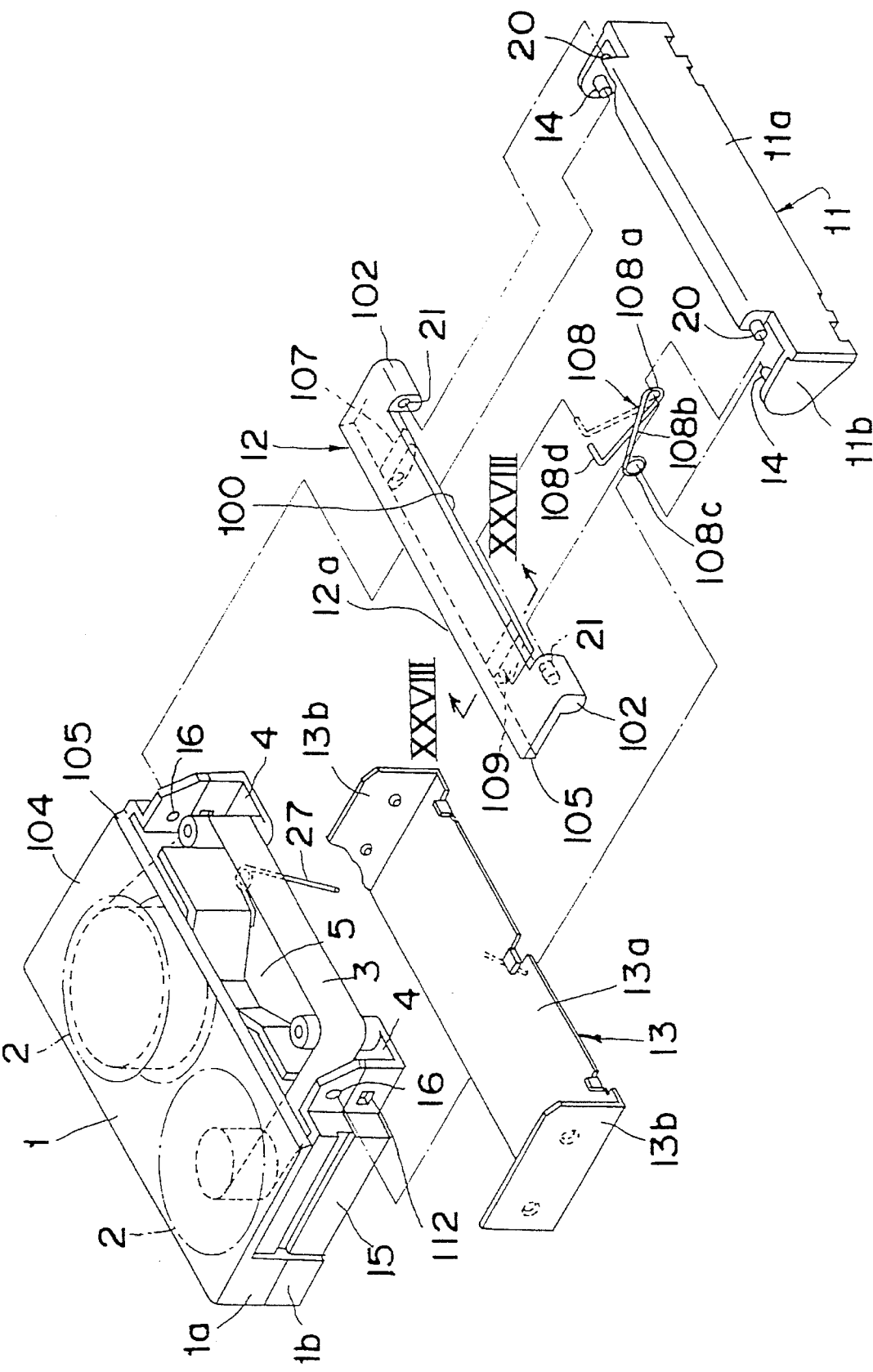
FIG. 27 is an exploded perspective view of a tape cartridge according to a sixth embodiment of the present invention.
Figure 32:
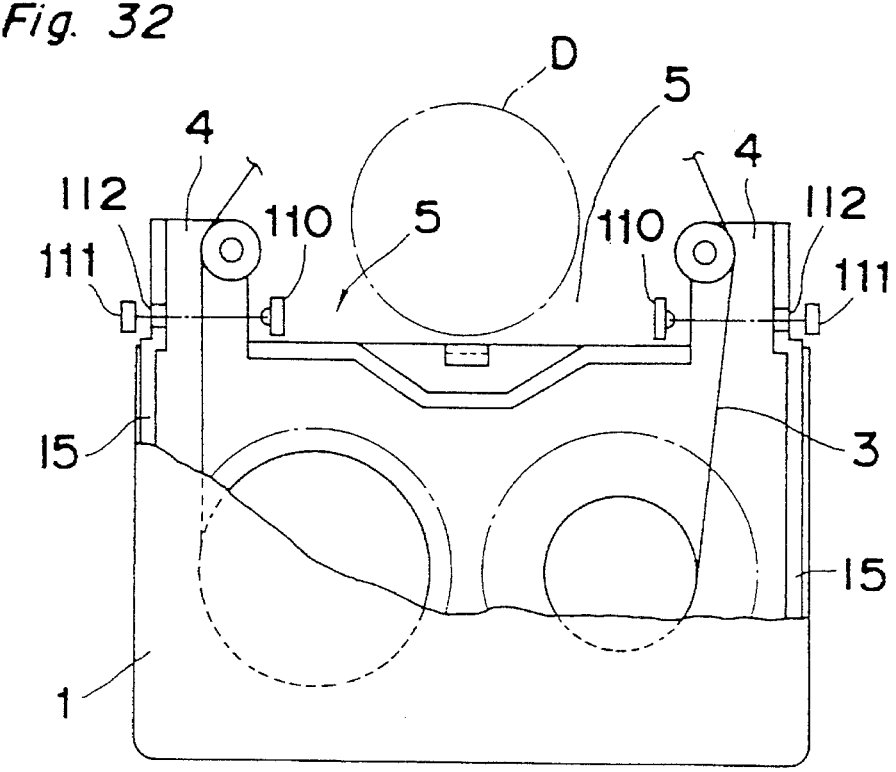
FIG. 32 is a top plan view, partly broken away, of the tape cartridge in FIG. 27 showing the state during use.

FIGS. 27 and 32 show the tape cartridge according to a sixth embodiment Of the present invention, in which the front lid 11, the upper lid 12 and the slider member 13 are also mounted on the main casing 1 substantially in the same manner as in the first embodiment.

In this embodiment, as shown in FIG. 27, an elongated cut out portion 100 is provided at the side of the front edge of the main face plate 12a of the upper lid 12, and bosses 102 having pin holes 21 are integrally formed at opposite sides of the cut out potion 100. Meanwhile, at the opposite sides on the upper edge of the front wall 11a of the front lid 11, pins 20 are laterally provided. By fitting the pins 20 into the pin holes 21, the forward edge of the upper lid 12 is pivotally connected to the upper edge of the front lid 11.

In the sixth embodiment, a guide means is provided between the main casing 1 and the upper lid 12 for guiding and displacing the upper lid 12 so that the main face plate 12a of the upper lid 12 rides over the upper surface of an upper wall 104 of the main casing 1 for withdrawal following the upward opening rotation of the front lid 11.

Figure 28:
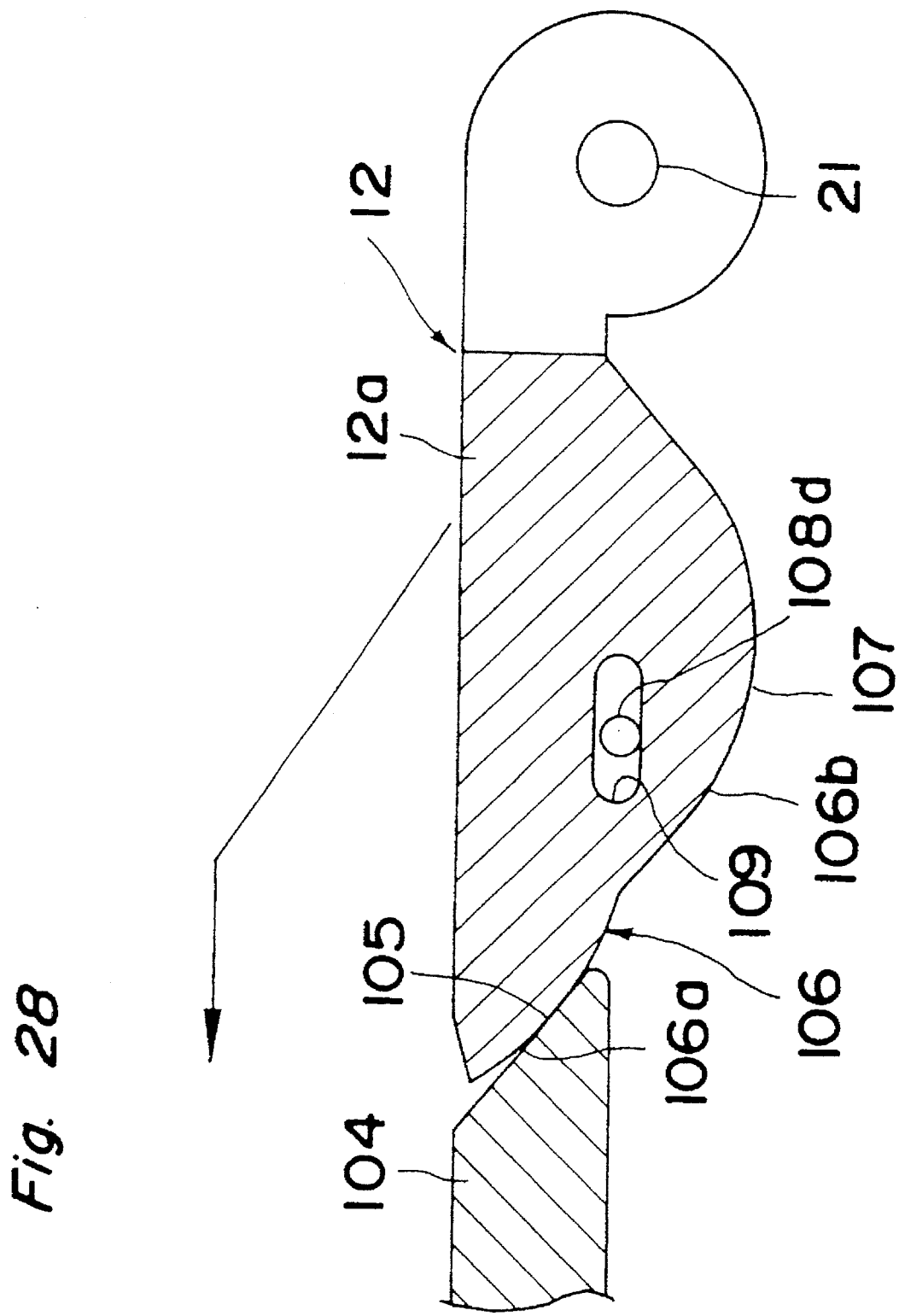
FIG. 28 is a cross section on an enlarged scale, taken along the line XXVIII—XXVIII in FIG. 27.
Figure 29:
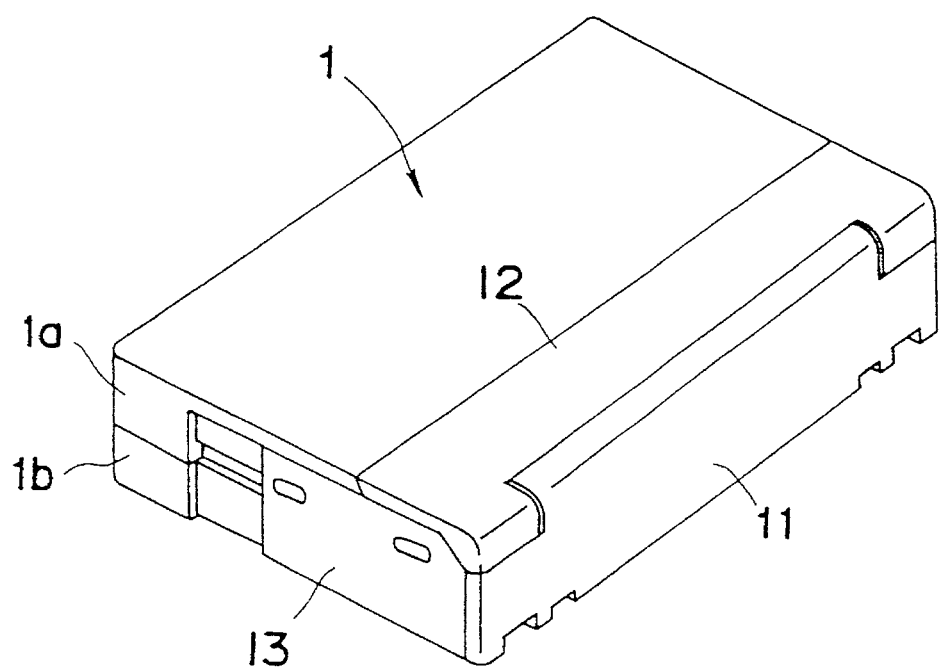
FIG. 29 is a perspective view of the tape cartridge in FIG. 27, in a state where its lid is closed.
Figure 30:
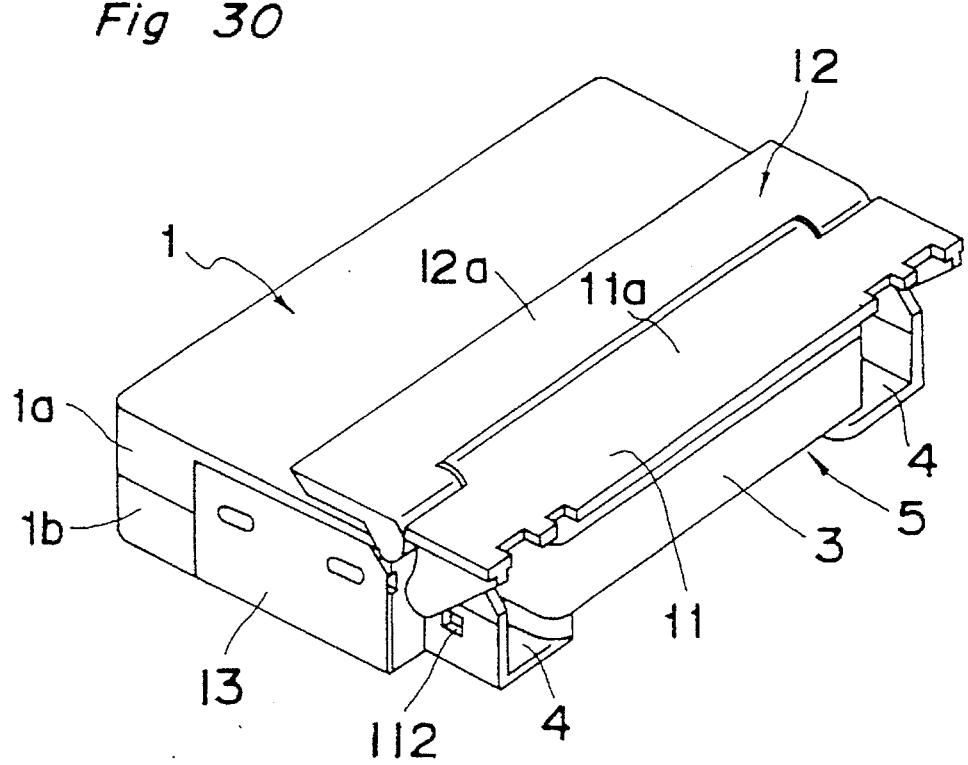
FIG. 30 is a view similar to FIG. 29, which particularly shows the state where its lid is opened.
Figure 31:
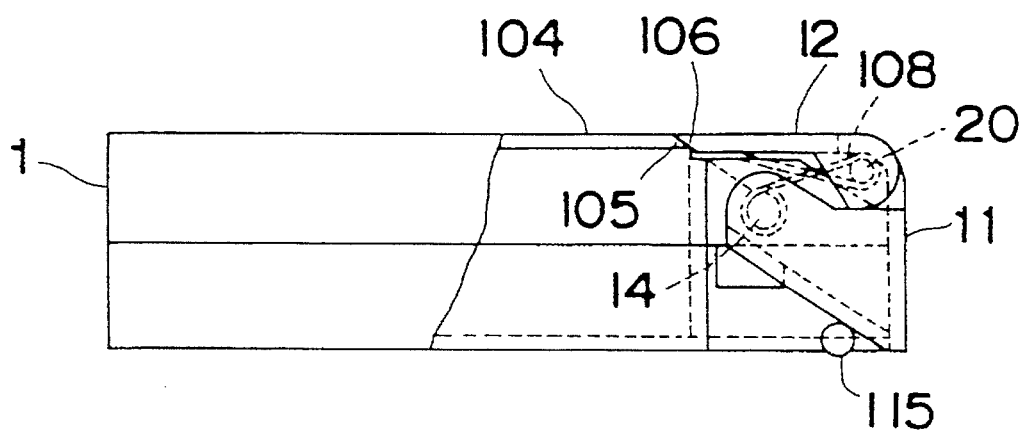
FIGS. 31(A), 31(B) and 31(C) are side elevational views for explaining lid opening process for the pocket in the tape cartridge in FIG. 27.
Figure 31:
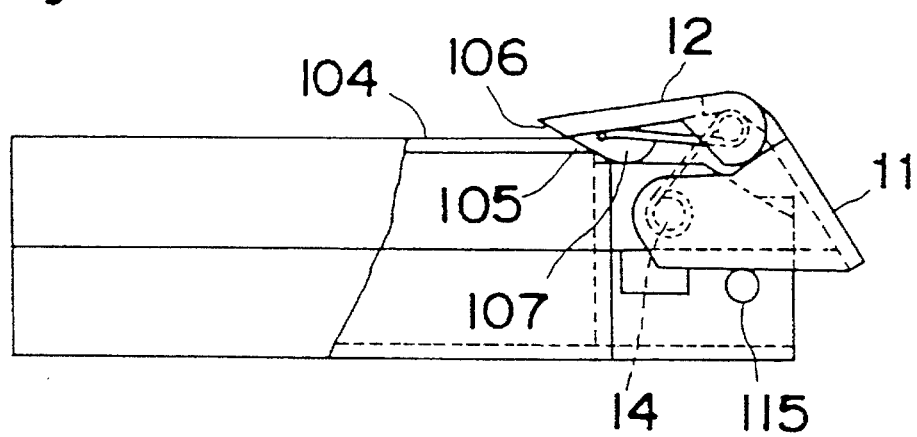
Figure 31:
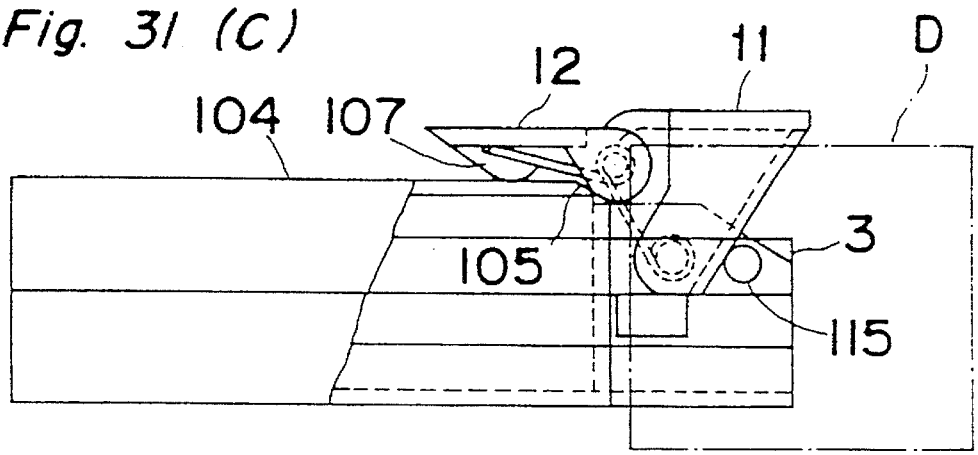

More specifically, for the above guide means, an inclined guide face 105 inclining downwards and forward is formed at the front edge of the upper wall 104 of the main casing 1, and another inclined guide face 106 inclining upwards and rearward (FIGS. 31(A), 31(B), 31(C)) is formed at the rear edge side on the under face of the main face plate 12a of the upper lid 12 (FIG. 28).

At opposite sides on the under surface of the main face plate 12a, guide projections 107 are formed to expand downward in the forward and backward directions. Therefore, the inclined guide face 106 on the side of the upper lid 12 includes a first inclined portion 106a and a second inclined portion 106b formed in a convex curved shape on the under surface of the guide projections 107. When the upper lid 12 is closed, the main face plate 12a is in the horizontal attitude, and the first inclined portion 106a is received by the inclined guide face 105 of the upper wall 104.

Separately, there is also provided a spring member 108 for urging the main face plate 12a of the upper lid 12 onto the upper face side of the upper lid 104 of the main casing 1. The spring member 108, as shown in FIG. 27, is made of a torsion spring having an intermediate coil portion 108a, a first arm 108b extending from the coil portion 108a, another coil portion 108c formed at the end of the first arm 108b, and a second arm 108d extending from the intermediate coil portion 108a generally in the same direction as that of the first arm 108b.

For assembly, the front lid 11 is pivotally connected about the shafts 14 on the main casing 1 in the manner as describe earlier, and the end coil portion 10c of the spring member 18 is fitted around one of the shafts 14. Subsequently, at the upper edge of the front face plate 11a of the front lid 11, the corresponding front edge of the main face plate 12a of the upper lid 12 is pivotally connected through the pins 20. In this case, the intermediate coil portion 108a of the spring member 108 is fitted around one of the pins 20, and the forward end of the second arm 108d of the spring member 108 is engaged, by bending the arm 108d from the solid line state to the dotted line state, with a hole 109 formed in one of the guide projections 107 at the side of the main plate 12a, as shown in FIG. 27.

By the above arrangement, during non-use of the tape cartridge, as shown in FIG. 31(A), the front face is maintained in the closed state by the front lid 11, with the upper face of the pocket 5 closed by the upper lid 12 respectively, through the single spring member 108. Simultaneously, the slider member 13 is also maintained in the state to close the under face of the pocket 5 by the spring member 27. In this case, in the upper lid 12, the inclined guide face 106 of the main face plate 12a, and more specifically, the first inclined face portion 106a is pressed against the inclined guide face 105 at the side of the upper wall 104 of the main casing 1 by the spring member 108.

When the tape cartridge is loaded on the video tape recorder, the slider member 13 is displaced backwards for opening, and as shown in FIG. 31(B), the front lid 11 is pivoted upward to be pushed open by the pin member 115 at the side of the video tape recorder. Following the above function, the upper lid 12 is displaced backwards from the upper face of the pocket 5, and the first inclined face portion 106a of the main face plate 12a, and then, the second inclined face portion 106b sequentially ride over the inclined guide face 105 at the side of the man casing 1, and thus, the second inclined face portion 106b is guided onto the upper face of the upper wall 104 of the main casing 1. When the front lid has been perfectly opened, as shown in FIG. 31(C), the main face plate 12a is supported horizontally without plays or looseness by the opposite guide projections 107 having the second inclined face portions 106b.

As described above, the upper lid 12 having the pivotal support point at its front edge, has its main face plate 12a depressed by the spring member 108 and is normally urged towards the side of the upper wall 104 of the main casing 1. Accordingly, the upper lid 12 is free from any plays during the open/close functions thereof, and such troubles, for example, that the rear edge of the main face plate 12a jumps up and the tape cartridge becomes unable to be drawn out from the Video tape recorder, may be advantageously prevented. During non-use period also, since the first inclined face portion 106a of the inclined guide face 106 at the side of the upper lid 12 closely adheres to the inclined guide face 105 at the side of the main casing 1 by the depressing face of the spring member 108, entry of dust into the interior of the main casing 1 from above the pocket 5 can also be prevented.

Moreover, since the spring member 108 urges the front lid 11 also into the closed state, it is not necessary to separately mount a spring member exclusive for urging the front lid 11 for rotation into the closed state, and thus, not only the number of parts is reduced, but efficiency in the assembling work may be improved.

As described above, since the upper lid 12 is so arranged that when it is opened, its main face plate 12a retreats backward from the upper face of the pocket 5 so as to be positioned on the upper wall 104, the head cylinder D at the side of the video tape recorder side may be directed deep into the pocket 5 as far as possible, as shown in FIG. 32, and thus, the intended object has been advantageously accomplished.

It is to be noted here that in the state where the head cylinder D has been inserted into a laterally central portion within the pocket 5, two light emitting elements 110 at the video tape recorder side are directed into the opposite portions within the pocket 5 from below in the state to hold the head cylinder D therebetween. On the other hand, at the video tape recorder side, light receiving elements 111 are disposed at opposite positions out of the main casing 1 and thus, detecting light from each of the light emitting elements 110 crosses the magnetic tape 3 in the vicinity of the tape draw-out ports 4, and is received by the light receiving elements 111 through light passing holes 112 in the opposite side walls 15 of the main casing 1. Thus, since the tape 3 has the magnetic tape portion not transmits the detecting light, and leader tape portions at its opposite sides, the starting end and terminal ene of the tape 3 may be detected.

Seventh Embodiment

Figure 33:
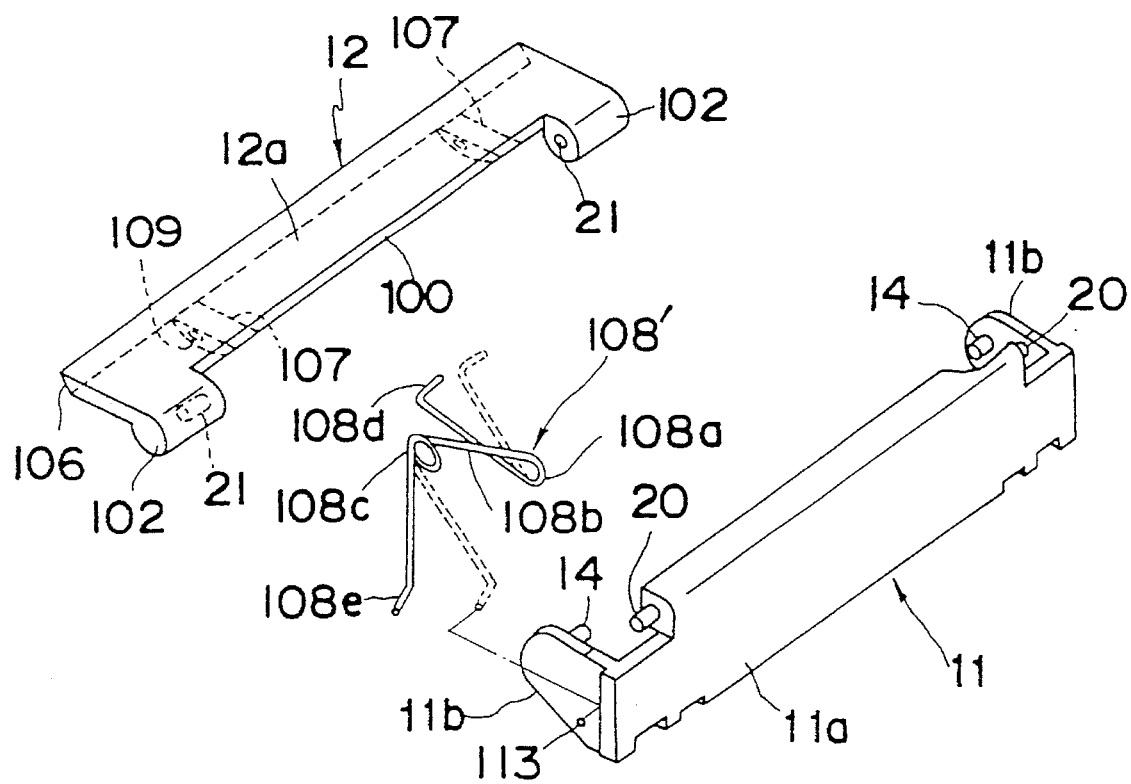
FIG. 33 is an exploded perspective view of an upper lid and a front lid associated with a spring member in a seventh embodiment of the present invention.

FIG. 33 shows a tape cartridge according to a seventh embodiment of the present invention, in which only the shape of the spring member 108 in the sixth embodiment has been altered, with like parts in FIG. 27 being designated by like reference numerals for brevity of explanation.

In this embodiment, in the shape of the spring member 108 as described earlier in the sixth embodiment, the spring member 108' further includes a third arm 108e downward extended from the end coil portion 108c, and this third arm 108e is bent from a free state shown in the solid lines to the state of the dotted lines so as to be engaged with one side wall 11b of the front lid 11. In FIG. 33, a hole 113 is formed in the side wall 11b at the side of the front lid 11, and the forward end of the third arm 108e is inserted in the hole 113 for engagement.

In this case, the third arm 108e functions to urge the front lid 11 into the closed state through rotation, and the second arm 108d functions to urge the upper lid 12 to the closed state.

Eighth Embodiment

FIGS. 34 to 37 show a tape cartridge according to an eighth embodiment of the present invention, in which the front lid 11, the upper lid 12 and the slider member 13 are attached to the main casing 1 substantially in the similar manner as in the first embodiment, with like parts being designated by like reference numerals for brevity of explanation.

In the eighth embodiment, the difference thereof from the first embodiment is such that a notch 121 whose lower end is opened, is formed, at the lateral central portion of the lower edge for the front wall 11a of the front lid 11, while at the forward edge of the bottom wall 13a of the slider member 13, a projection 122 is extended upward so as to be positioned at the backward reverse side of the notch 121.

Figure 34:
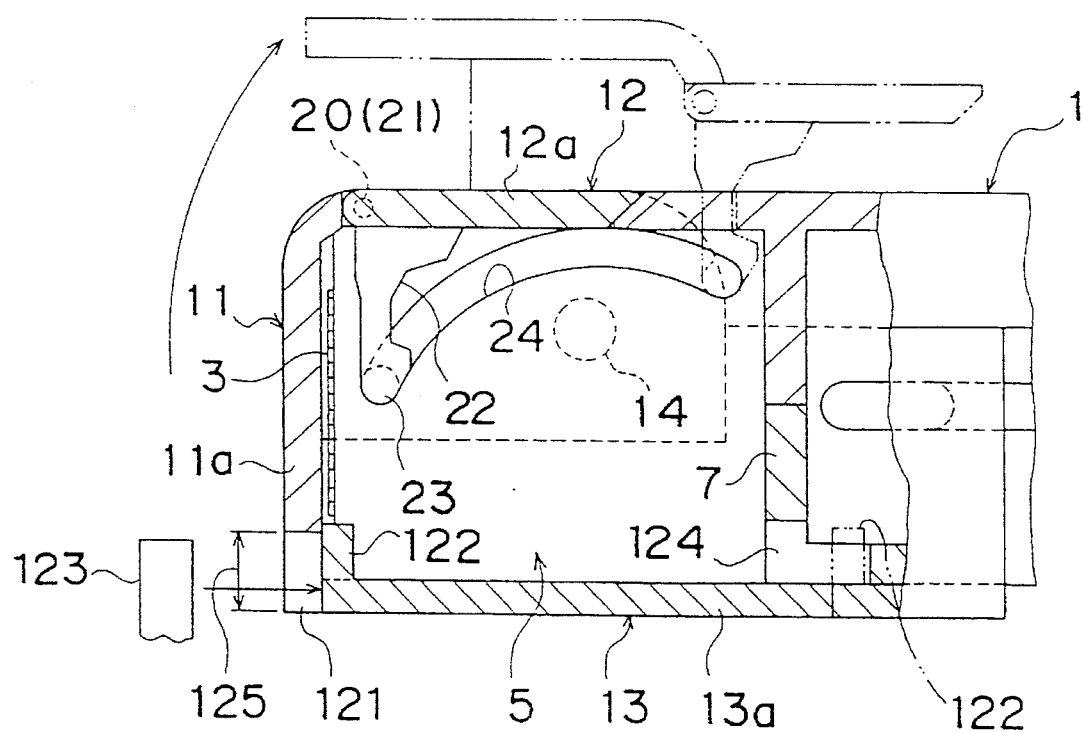
FIG. 34 is a fragmentary side sectional view of a tape cartridge according to an eighth embodiment of the present invention.
Figure 35:
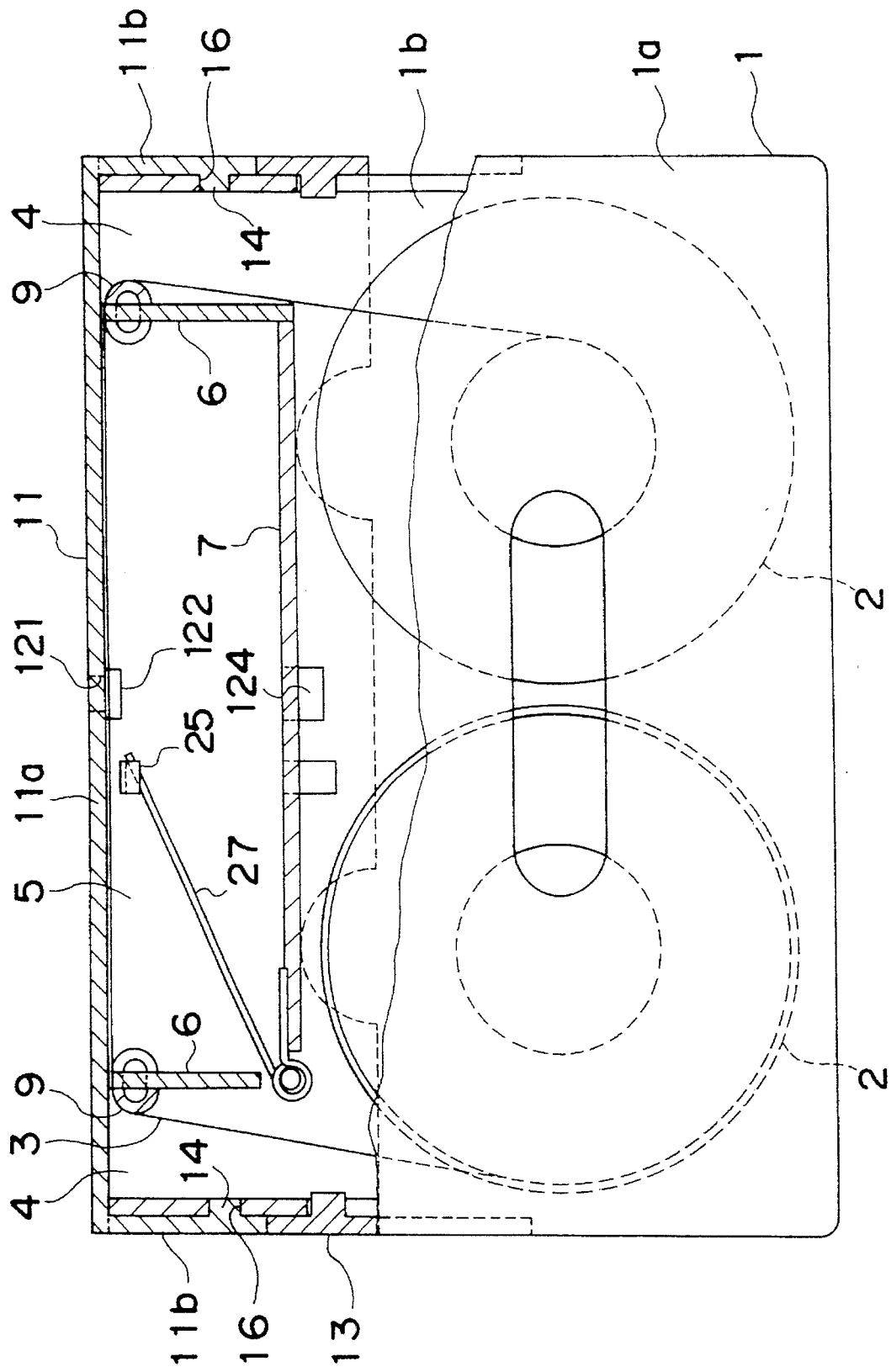
FIG. 35 is a top plan view partly broken away and in section, of a tape cartridge according to an eighth embodiment of the present invention.
Figure 36:
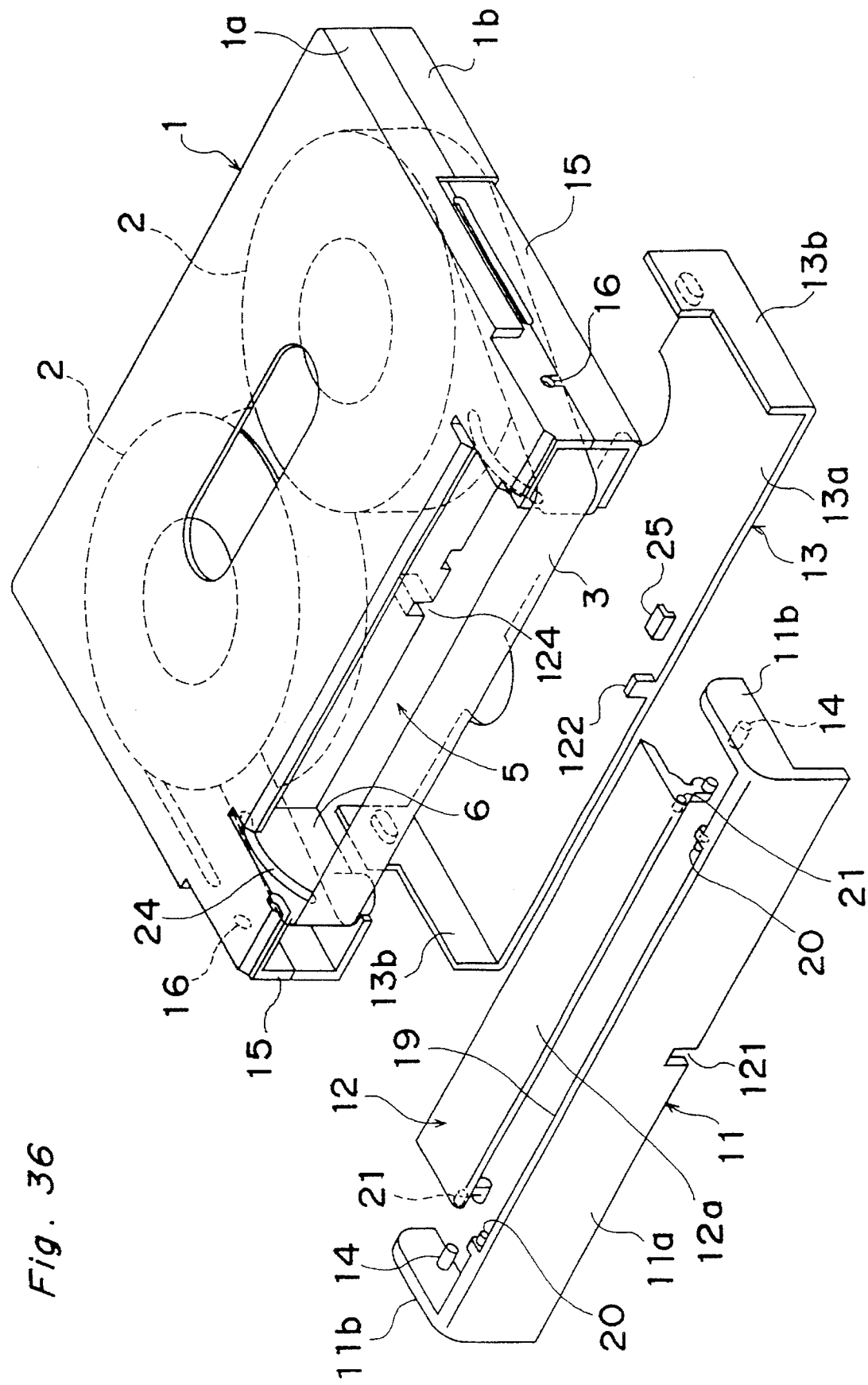
FIG. 36 is an exploded perspective view of the tape cartridge in FIG. 35.

When the tape cartridge is loaded on the video tape recorder, a slider opening member 123 (FIG. 34) at the side of the video tape recorder is fitted into the notch 121 to contact the projection 122, and thus, the slider member 13 is displaced to the rear open position against the spring member 27. Thereafter, in the similar manner as in the first embodiment, the front lid 11F is pivoted for upward opening, and following this function, the upper lid 12 movements to the rear side from the upper face of the pocket 5. It is to be noted here that, the backward displacing stroke of the slider member 13 is generally set to be larger than the depth of the pocket 5 in the forward and backward directions, and in such a case, as shown in FIG. 34, an escape groove 124 for the projection 122 during the backward displacement of the slider member 13 is provided on the rear wall 7 of the pocket 5 for the main casing 1.

Figure 37A:
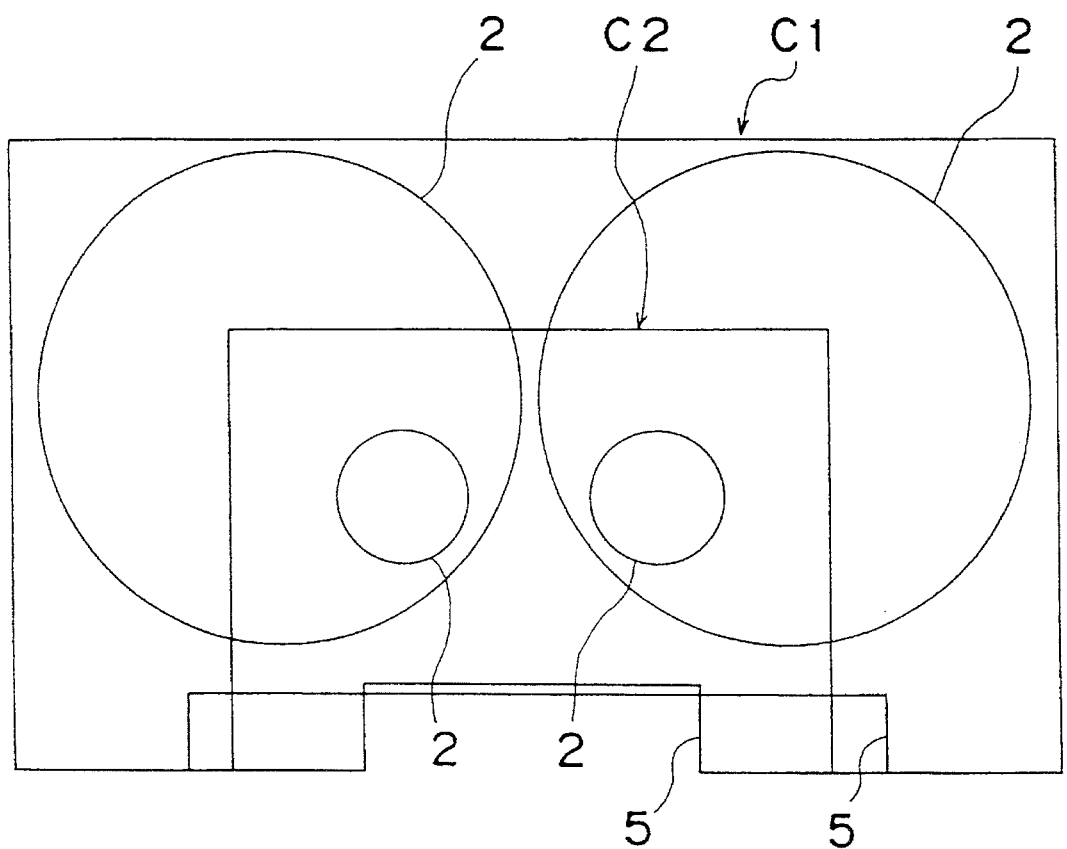
FIG. 37(A) is a op plan view of a large tape cartridge.
Figure 37B:
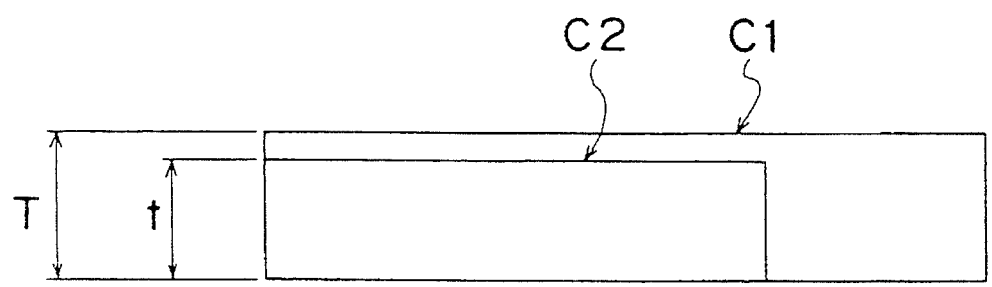
FIG. 37(B) is a side elevational view of a small tape cartridge, both of which are to be used for a compatible system for the eighth embodiment of the present invention.
Figure 38:
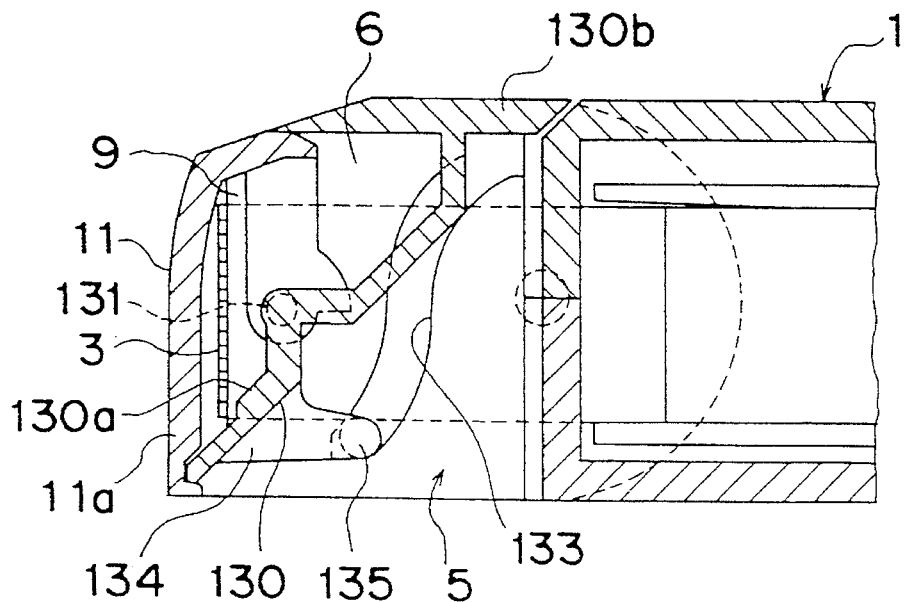
FIG. 38 is a fragmentary side sectional view showing a conventional tape cartridge, in a state where its lid is closed (already referred to)
Figure 39:
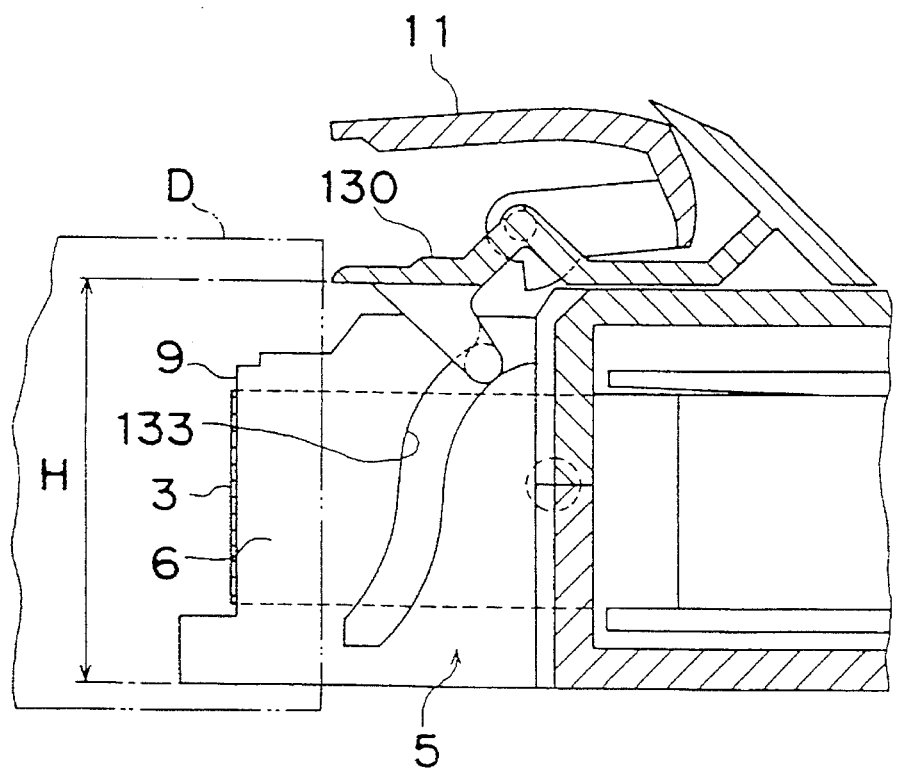
FIG. 39 is a view similar to FIG. 38, which particularly shows the tape cartridge in the opened state (already referred to).

However, in a tape cartridge for a compatible system, there are a large sized cartridge C1 and another cartridge C2 of a smaller size than the above, as shown in FIGS. 37(A) and 37(B). The smaller sized tape cartridge C2 is smaller than the large sized tape cartridge respectively in heights, lateral lengths, and forward and backward widths. Therefore, there is a case where the small sized tape cartridge C2 is accidentally loaded on the video tape recorder for the large tape cartridge C1, and thus it is necessary to preliminarily prevent such mis-loading.

Accordingly, a height 125 of the notch 121 is set to be larger than a difference (T–t) between the height t of the large sized tape cartridge C1 and the height t of the smaller sized tape cartridge C2. By this arrangement, even when the small sized tape cartridge C2 is wrongly loaded onto a holder of a video tape recorder for a large tape cartridge C1, the front lid of the smaller sized tape cartridge C2 contact the slider opening member 123 at the side of the video tape recorder, and thus, the erroneous loading of the smaller sized tape cartridge C2 may be advantageously prevented.

According to the present invention, by pivotally connecting the upper lid 12 to the upper rear portion of the front lid 11, and causing the upper lid 12 to movement backward to a large extent from the upper face of the pocket 5 in association with the upward opening rotation of the front lid 11, the effective opening height H of the pocket 5 is adapted to be enlarged. Accordingly, in the video tape recorder, it becomes possible to insert the head cylinder D deep into the pocket 5 as far as possible, which arrangement is particularly suitable for compact size and weight reduction for the video tape recorder.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A tape cartridge which comprises:
    a main casing containing a tape, said main casing having an upper wall with an upper surface, including on a front portion at left and right sides thereof ports for drawing out tape, and a pocket with an upper surface at a rear side for tape loading, said pocket being open at upper and lower sides and front side of the pocket between the ports and formed in a recess at said front portion of said main casing,
    a front lid having a front wall pivotally supported for upward movement on said front portion of said main casing by a shaft for selective movement between a closed position and a rotated upward position for closing and opening, respectively, of said front portion of said main casing,
    an upper lid for electively opening and closing an upper face of said pocket along with the opening and closing, respectively, of said front lid, said upper lid having a main face plate being pivotally connected by way of pins at a forward edge of said main face plate of said upper lid to an upper edge of said front wall of said front lid, and
    means provided between said main casing and said upper lid for guiding said upper lid so that said main face plate of said upper lid is withdrawn towards a rear portion on said upper surface of said pocket along with said upward opening rotation of said front lid, said guiding means including sliding pieces provided at a rear edge side of said main face plate of said upper lid, and guide grooves provided on said upper surface of said upper wall of said main casing at a rear portion of said upper surface of said pocket, with said sliding pieces slidably engaging said guide grooves for selective sliding movement in a forward direction and a backward direction.

2. A tape cartridge as in claim 1, wherein said sliding pieces are provided at opposite left and right sides of said rear edge side of said main face plate of said upper lid, and a recess for receiving said main face plate of said upper lid is provided on said upper surface of said upper wall of said main casing, with said guide grooves for engaging said sliding pieces being respectively provided at opposite sides of said recess.

* * * * *